US012390391B1

(12) United States Patent
Yan et al.

(10) Patent No.: US 12,390,391 B1
(45) Date of Patent: Aug. 19, 2025

(54) MASSAGE DEVICE

(71) Applicants: Dongguan Qunan Technology Co., Ltd., Guangdong (CN); Shenzhen Zhonghongtian Technology Co., Ltd, Shenzhen (CN)

(72) Inventors: Bo Yan, Guangdong (CN); Hong Zhang, Shenzhen (CN)

(73) Assignees: Dongguan Qunan Technology Co., Ltd, Dongguan (CN); Shenzhen Zhonghongtian Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/666,796

(22) Filed: May 16, 2024

(30) Foreign Application Priority Data

Feb. 21, 2024 (CN) ......................... 202420331832.0
Mar. 1, 2024 (CN) ......................... 202420402674.3

(51) Int. Cl.
*A61H 19/00* (2006.01)
*A61H 11/00* (2006.01)
*A61H 15/00* (2006.01)

(52) U.S. Cl.
CPC ............ *A61H 19/44* (2013.01); *A61H 11/00* (2013.01); *A61H 15/0085* (2013.01); *A61H 19/32* (2013.01); *A61H 19/34* (2013.01); *A61H 2015/0028* (2013.01); *A61H 2015/0071* (2013.01); *A61H 2201/1481* (2013.01); *A61H 2201/1695* (2013.01)

(58) Field of Classification Search
CPC .................... A61H 19/44; A61H 19/32; A61H 2201/1215; A61H 2205/087; A61H 19/50; A61H 21/00; A61H 19/30; A61H 23/0254; A61H 23/00; A61H 7/005; A61H 2201/10; A61H 19/00; A61H 15/00; A61H 2015/0014; A61H 2015/0071
See application file for complete search history.

(56) References Cited

U.S. PATENT DOCUMENTS

2011/0133910 A1* 6/2011 Alarcon .................. G06F 3/016 340/407.1

* cited by examiner

*Primary Examiner* — Christine H Matthews

(57) ABSTRACT

A massage device includes a housing and at least one massage assembly provided on the housing. The massage assembly includes a driving assembly disposed in the housing and a massage member engaged with the driving wheel and the at least one driven wheel. The driving assembly includes a driving source, a driving wheel connected to the driving source and at least one driven wheel for cooperating with the driving wheel. The driving source is configured to drive the massage member to rotate through the driving wheel.

18 Claims, 35 Drawing Sheets

MASSAGE DEVICE

CROSS-REFERENCE TO RELATED APPLICATIONS

The present disclosure claims priorities of Chinese Patent Application No. 202420402674.3, filed on Mar. 1, 2024, and Chinese Patent Application No. 202420331832.0, filed on Feb. 21, 2024, the entire contents of which are hereby incorporated by reference.

TECHNICAL FIELD

The present disclosure relates to the field of medical equipment, in particular to a massage device.

DESCRIPTION OF THE PRIOR ART

With the development of society and the improvement of living standards, people are paying more and more attention to their own health and the comfort of life. Medical equipment, such as massage device, is becoming more and more popular among the public.

Some existing massage devices use a motor to drive the massage head to frequently beat and thus to stimulate the muscles. However, such massage devices can only stimulate a small area, making it difficult to achieve the desired massage effect.

SUMMARY OF THE DISCLOSURE

In view of the above, the object of the present disclosure is to provide a massage device that can effectively increase the stimulation area and improve sexual experience.

Embodiments of the present disclosure provide a massage device for sexual purpose. The massage device includes a housing and at least one massage assembly provided on the housing. The massage assembly includes a driving assembly disposed in the housing and a massage member engaged with the driving wheel and the at least one driven wheel. The driving assembly includes a driving source, a driving wheel connected to the driving source and at least one driven wheel for cooperating with the driving wheel. The driving source is configured to drive the massage member to rotate through the driving wheel.

Compared with the existing massage devices, the massage device according to the embodiments of the present disclosure creates a kneading effect on the massaged part of the human body through the rotation of the massage member and can act on a larger area, effectively improving the stimulation and massage effect.

BRIEF DESCRIPTION OF DRAWINGS

The accompanying drawings, which are incorporated in and constitute a part of this specification, illustrate several embodiments of the present disclosure and together with the description, serve to explain the principles of the present disclosure.

DESCRIPTION OF EMBODIMENTS

Figure 1:
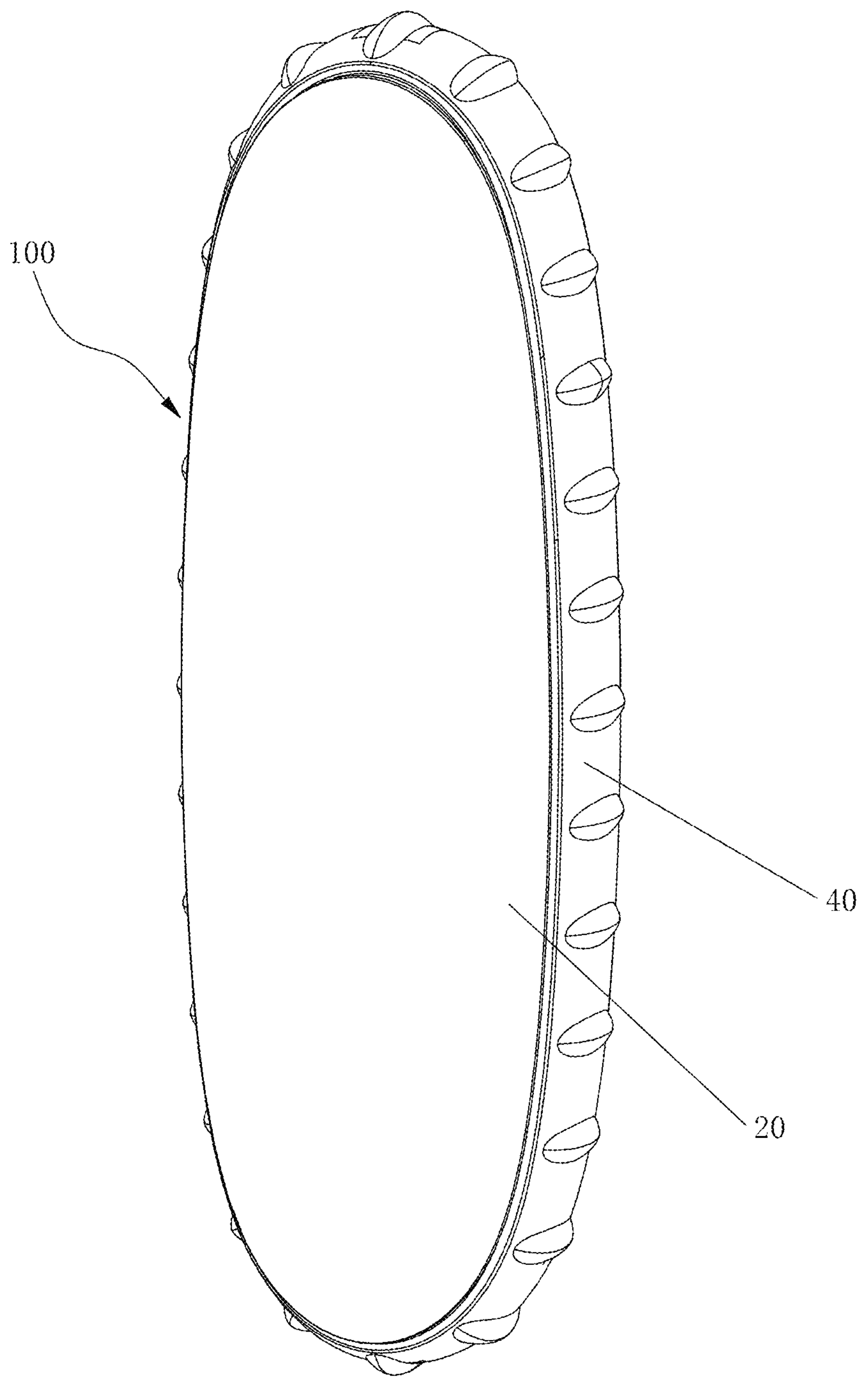
FIG. 1 is a perspective view of a first embodiment of a massage device of the present disclosure.
Figure 2:
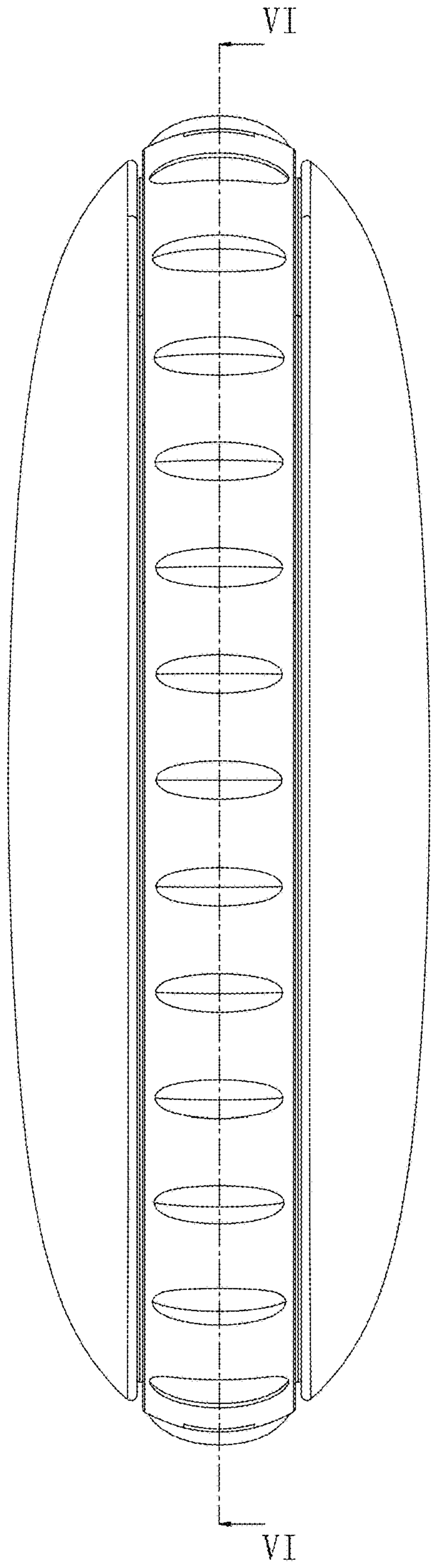
FIG. 2 is a front view of the massage device shown in FIG. 1.
Figure 3:
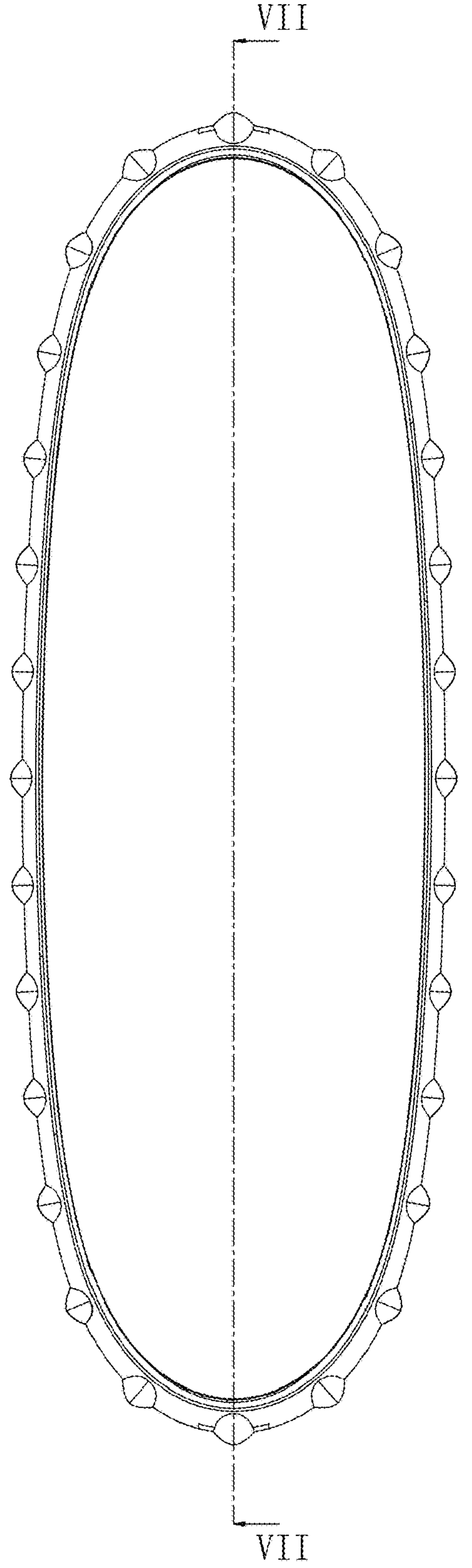
FIG. 3 is a side view of the massage device shown in FIG. 1.
Figure 4:
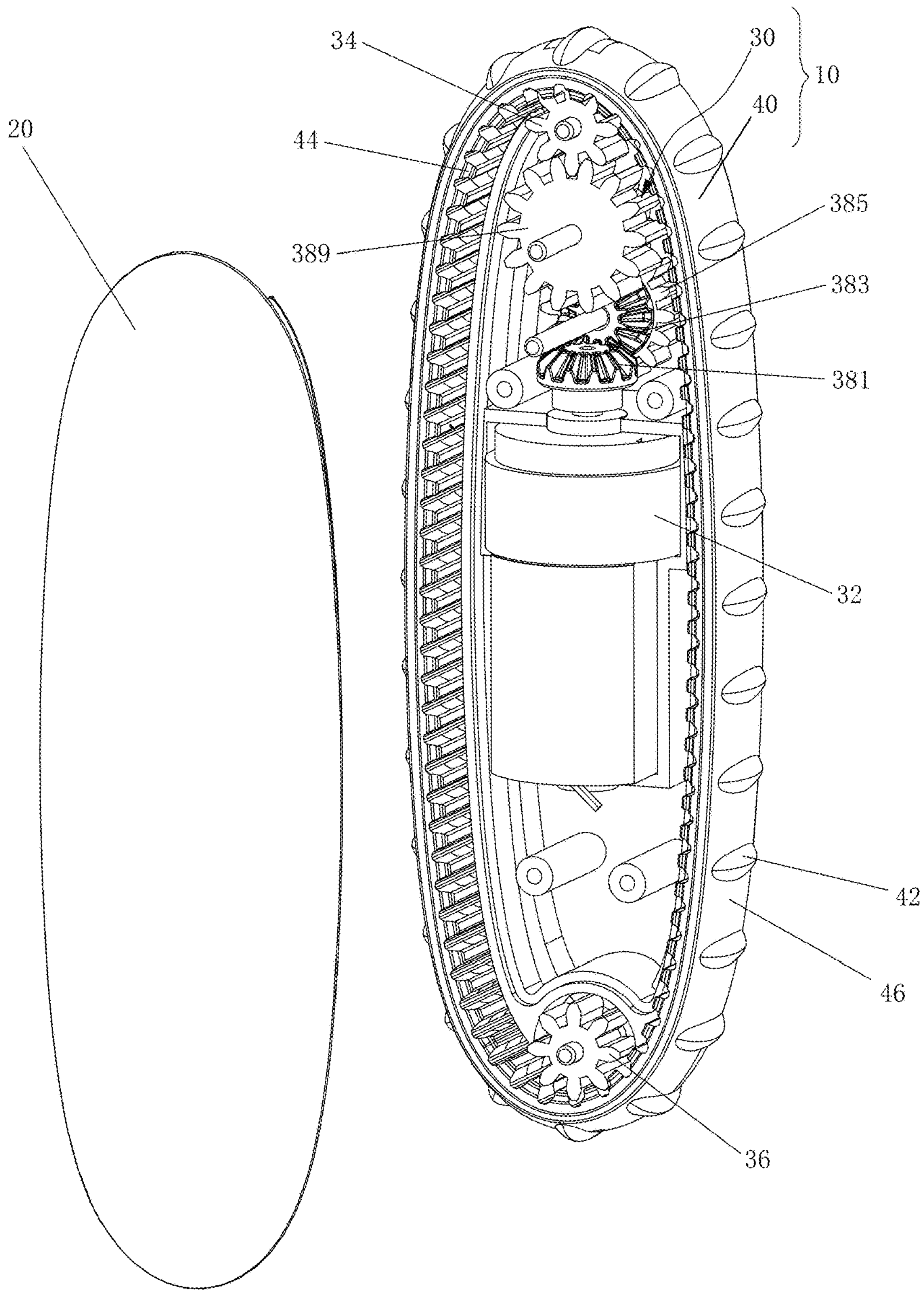
FIG. 4 is an exploded view of the massage device shown in FIG. 1.
Figure 5:
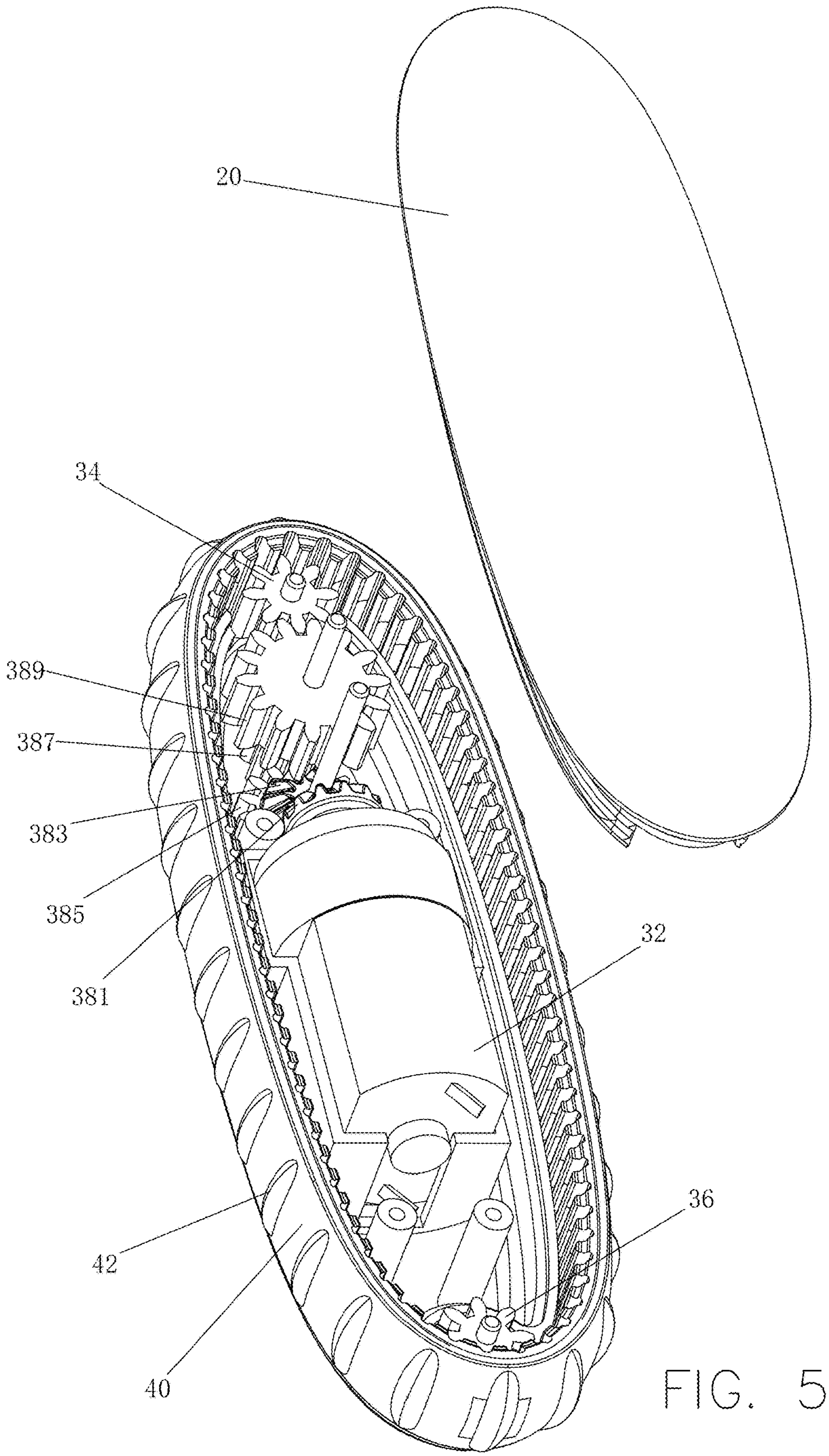
FIG. 5 is an exploded view of the massage device shown in FIG. 1 from another perspective.

Reference throughout this specification to "one embodiment", "an embodiment", "some embodiments", "embodiments", or similar language means that a particular feature, structure, or characteristic described in connection with the embodiment is included in at least one embodiment of the present disclosure. Thus, appearances of the phrases "in one embodiment", "in an embodiment", "in some embodiments", "in embodiments" and similar language throughout this specification may, but do not necessarily, all refer to the same embodiment.

The terminology used herein is for the purpose of describing particular embodiments only and is not intended to be limiting of this disclosure. As used herein, the singular forms "a", "an", and "the" are intended to include the plural forms as well, unless the context clearly indicates otherwise.

Furthermore, the use of the terms "a", "an", etc., do not denote a limitation of quantity, but rather denote the presence of at least one of the referenced items. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, integers, steps, operations, elements, components, and/or groups thereof.

For the purposes of disclosure, the word "substantially" is defined as "for the most part", it means "to a great extent", but having some room for some minor variation.

Moreover, the described features, structures, or characteristics of the disclosure may be combined in any suitable manner in one or more embodiments. Features, structures, or characteristics of one embodiment can be mixed and matched with features, structures, or characteristics of another embodiment. It will be apparent to those skilled in the art that various modifications and variations can be made to the present disclosure without departing from the spirit and scope and purpose of the disclosure. Thus, it is intended that the present disclosure cover the modifications and variations of this disclosure provided they come within the scope of the appended claims and their equivalents. Reference will now be made in detail to the preferred embodiments of the disclosure.

Referring to FIGS. 1 to 5, a massage device 100 for sexual purpose according to a first embodiment includes a housing 20 and a massage assembly 10 provided on the housing 20. The massage assembly 10 includes a driving assembly 30 disposed in the housing 20, and a massage member 40 surrounding the housing 20. The driving assembly 30 includes a driving source, for example, a driving motor 32, a driving wheel 34 that is connected to the driving motor 32, and a driven wheel 36 that cooperates with the driving wheel 34. The massage member 40 surrounds and is engaged with the driving wheel 34 and the driven wheel 36, and the driving motor 32 drives the massage member 40 to rotate around the housing 20 through the driving wheel 34. The massage device 100 according to the first embodiment is used to be placed in the vagina or the rectum, for creating a kneading effect on the vaginal wall or the rectal wall of the human body through the rotation of the massage member 40. Compared with the existing massage devices providing frequent beat, the massage device 100 according to the first embodiment can act on a larger area, effectively improving the stimulation and massage effect.

Figure 6:
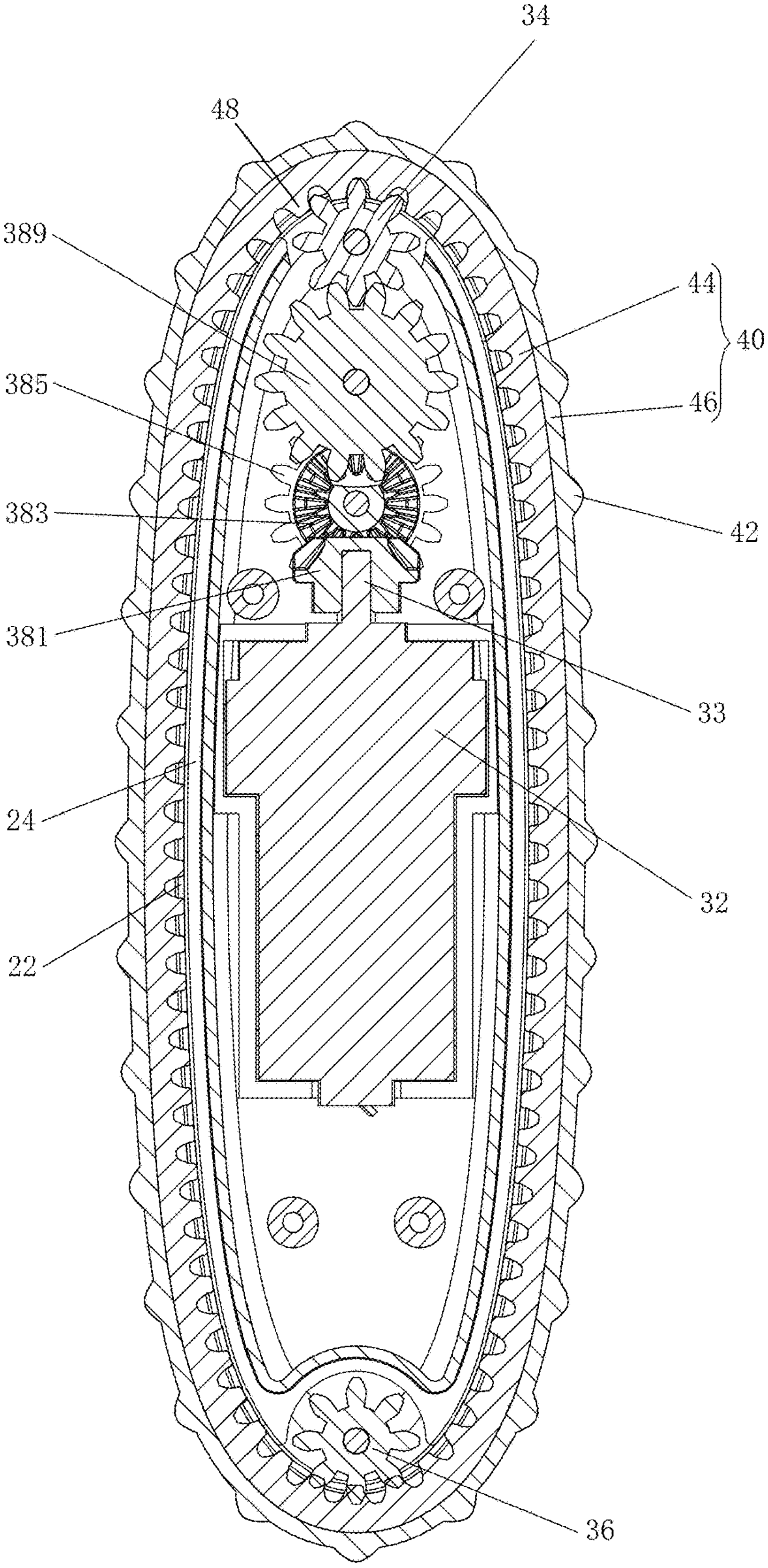
FIG. 6 is a cross-sectional view of the massage device shown in FIG. 2 along line VI-VI.
Figure 7:
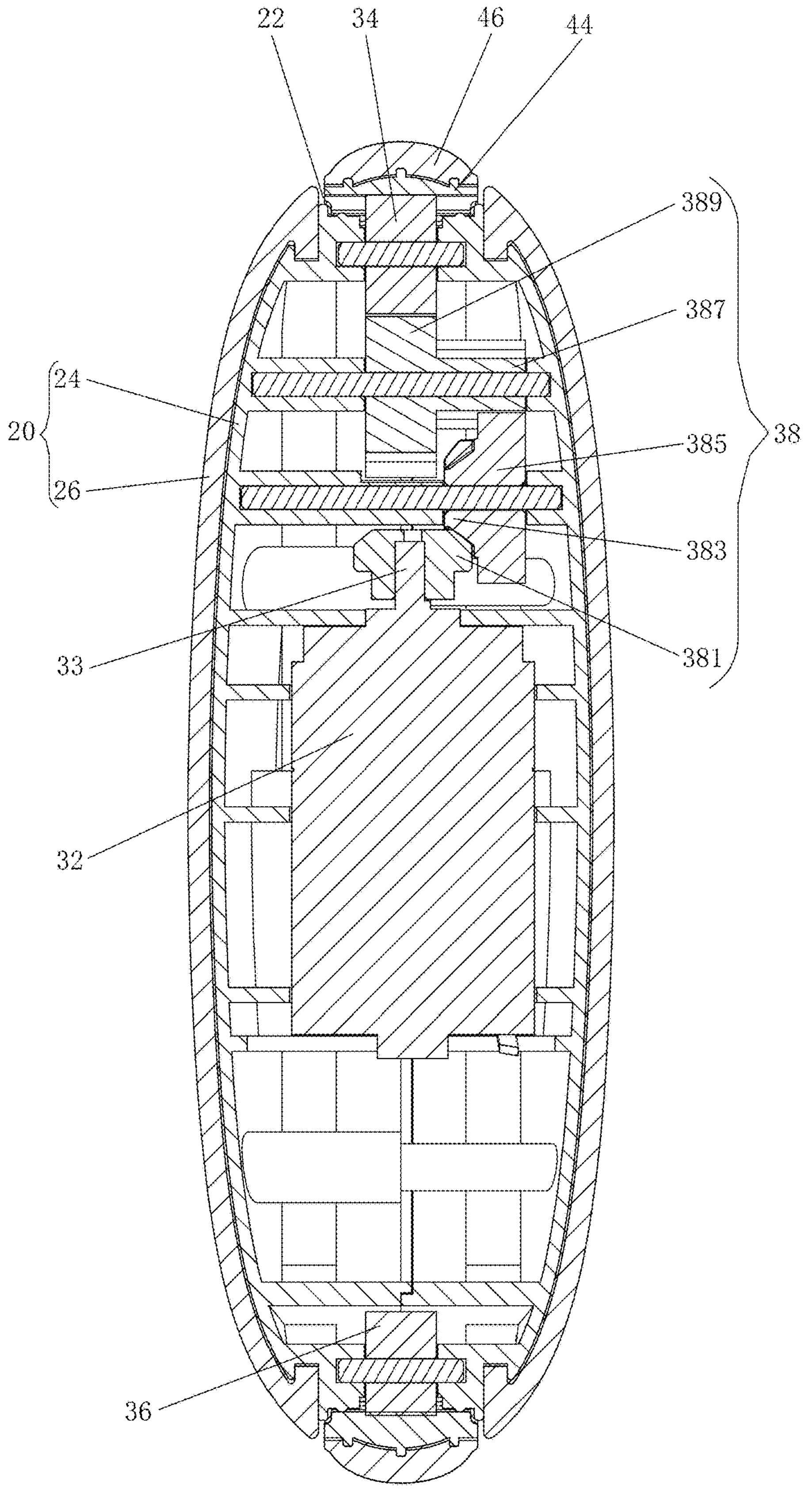
FIG. 7 is a cross-sectional view of the massage device shown in FIG. 3 along line VII-VII.
Figure 8:
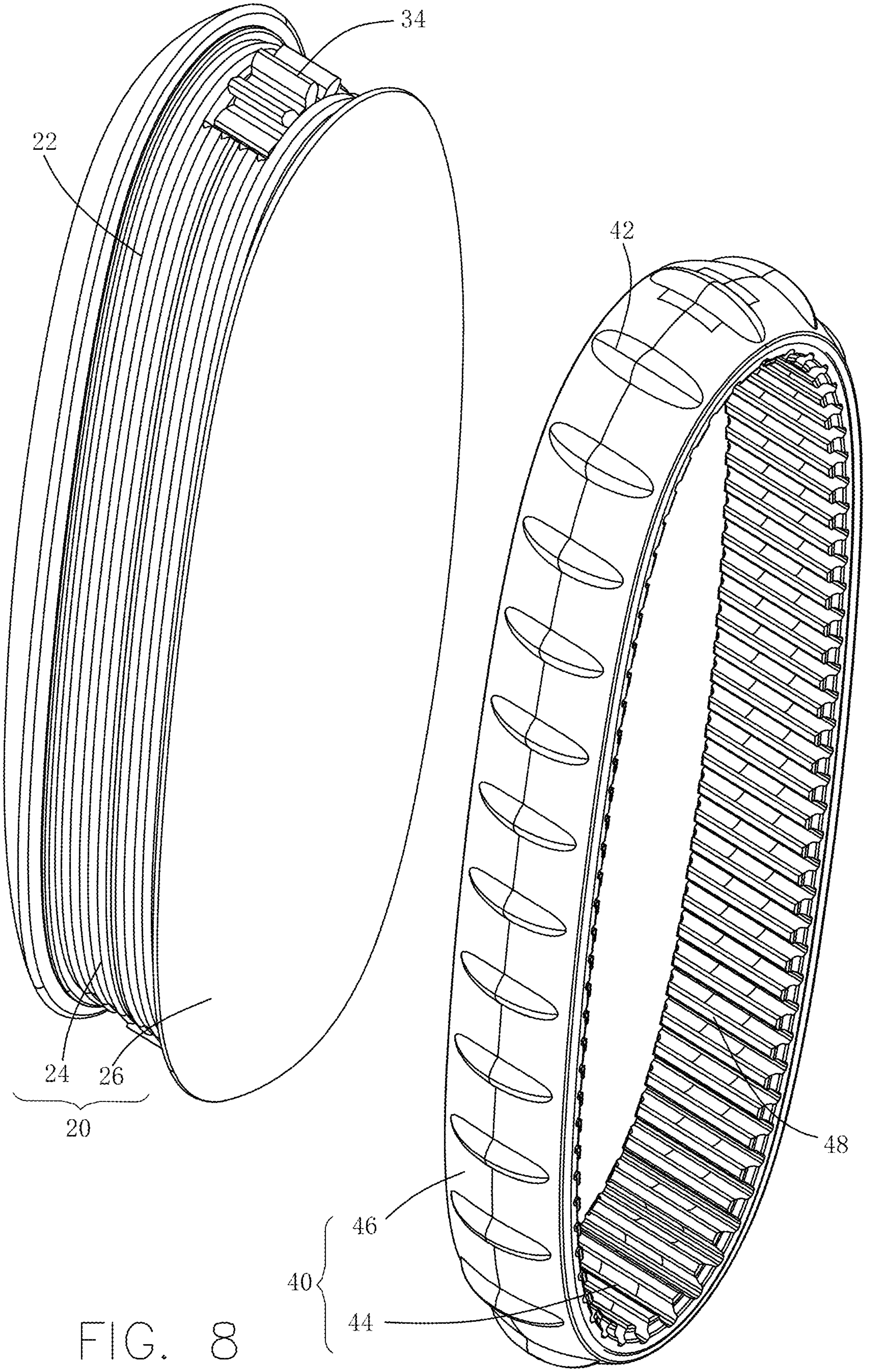
FIG. 8 is another exploded view of the massage device shown in FIG. 1.

Referring to FIGS. 6 to 8, an annular groove 22 is defined on the outer circumferential surface of the housing 20 to provide an installation space and a rotation path for the massage member 40. In this embodiment, the massage member 40 is shaped like a ring, and specifically, shaped like an elliptical caterpillar belt. Accordingly, the annular groove 22 of the housing 20 is elliptical. The depth of the annular groove 22 relative to the outer surface of the housing 20 is less than the thickness of the massage member 40, so that after assembly, part of the massage member 40 is received in the annular groove 22, while the other part protrudes to a certain height relative to the outer surface of the housing 20, so as to ensure that the massage member 40 is in full contact with the vaginal wall or the rectal wall. Preferably, the outer surface of the massage member 40 is provided with a plurality of protrusions 42 which protrude outwardly. The protrusions 42 protrude outwardly relative to the outer surface of the housing 20. Specifically, the protrusions 42 can be convex points, convex pillars, convex strips, convex ribs, etc., distributed at intervals along the outer circumference of the massage member 40. In this embodiment, the protrusions 42 are shaped as elongate convex ribs. When the massage member 40 rotates around the housing 20 to massage the human body, the protrusions 42 can improve the stimulation effect on the vaginal wall or the rectal wall.

Figure 9:
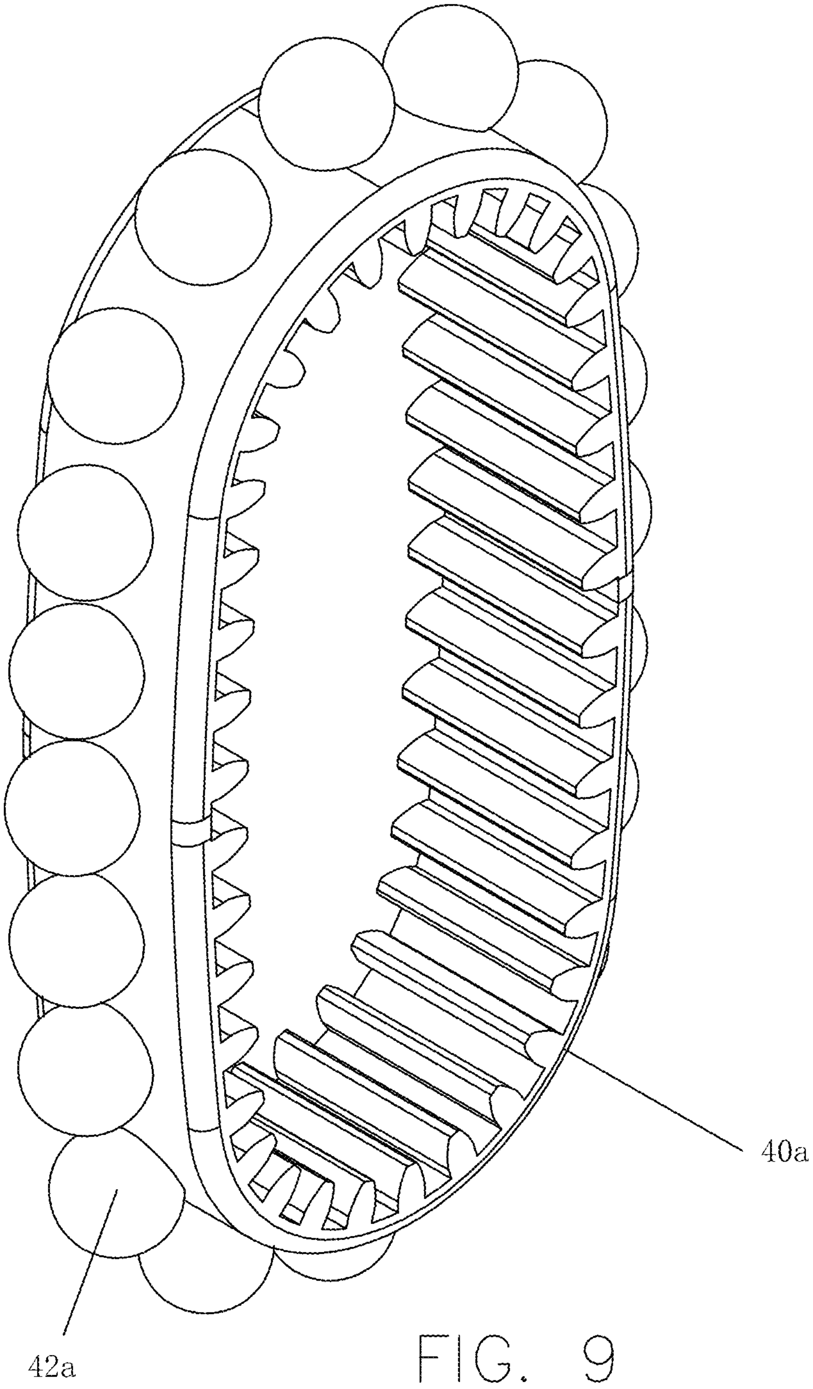
FIG. 9 is a first alternative of the massage member shown in FIG. 8.
Figure 10:
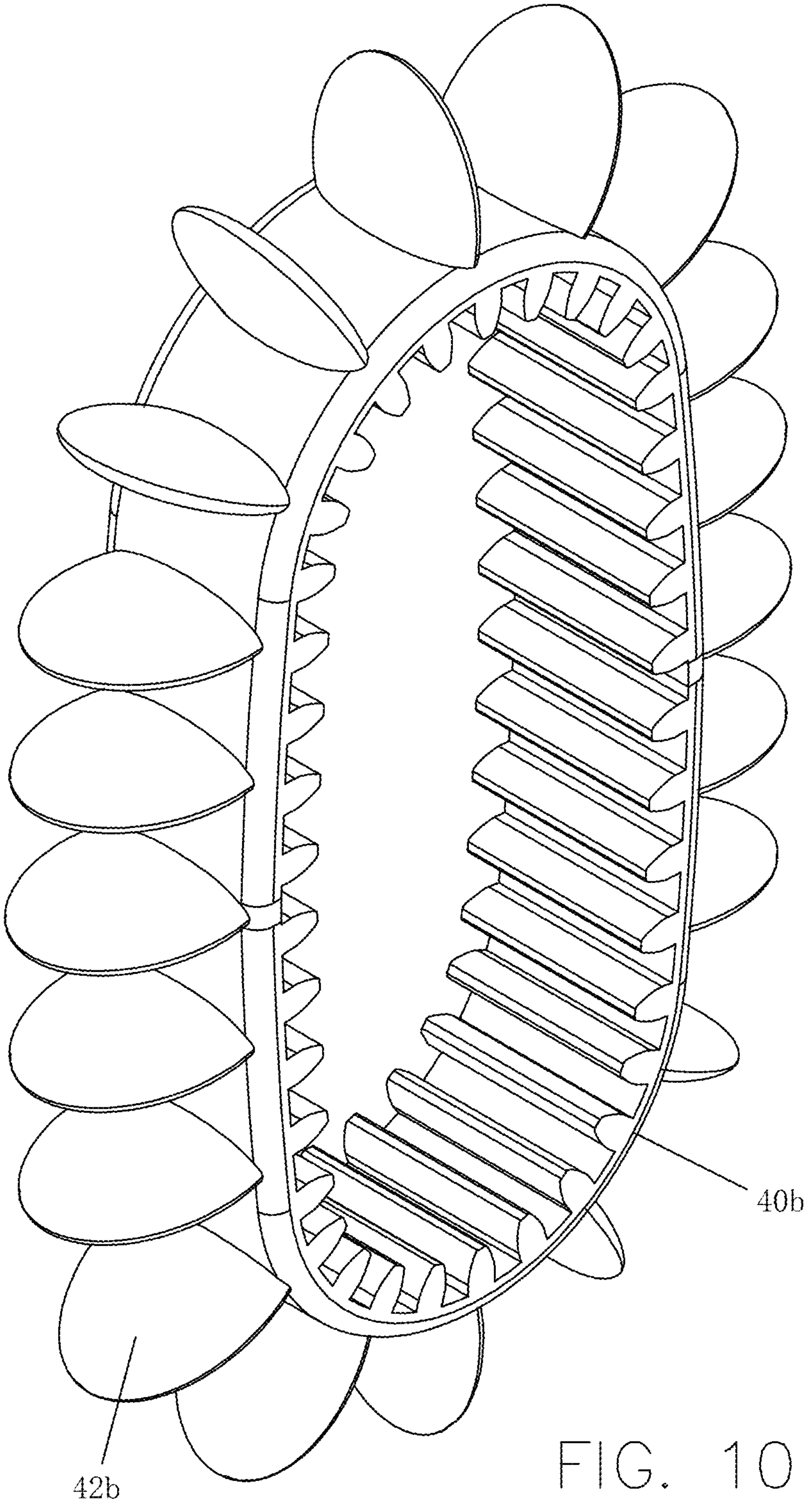
FIG. 10 is a second alternative of the massage member shown in FIG. 8.
Figure 11:
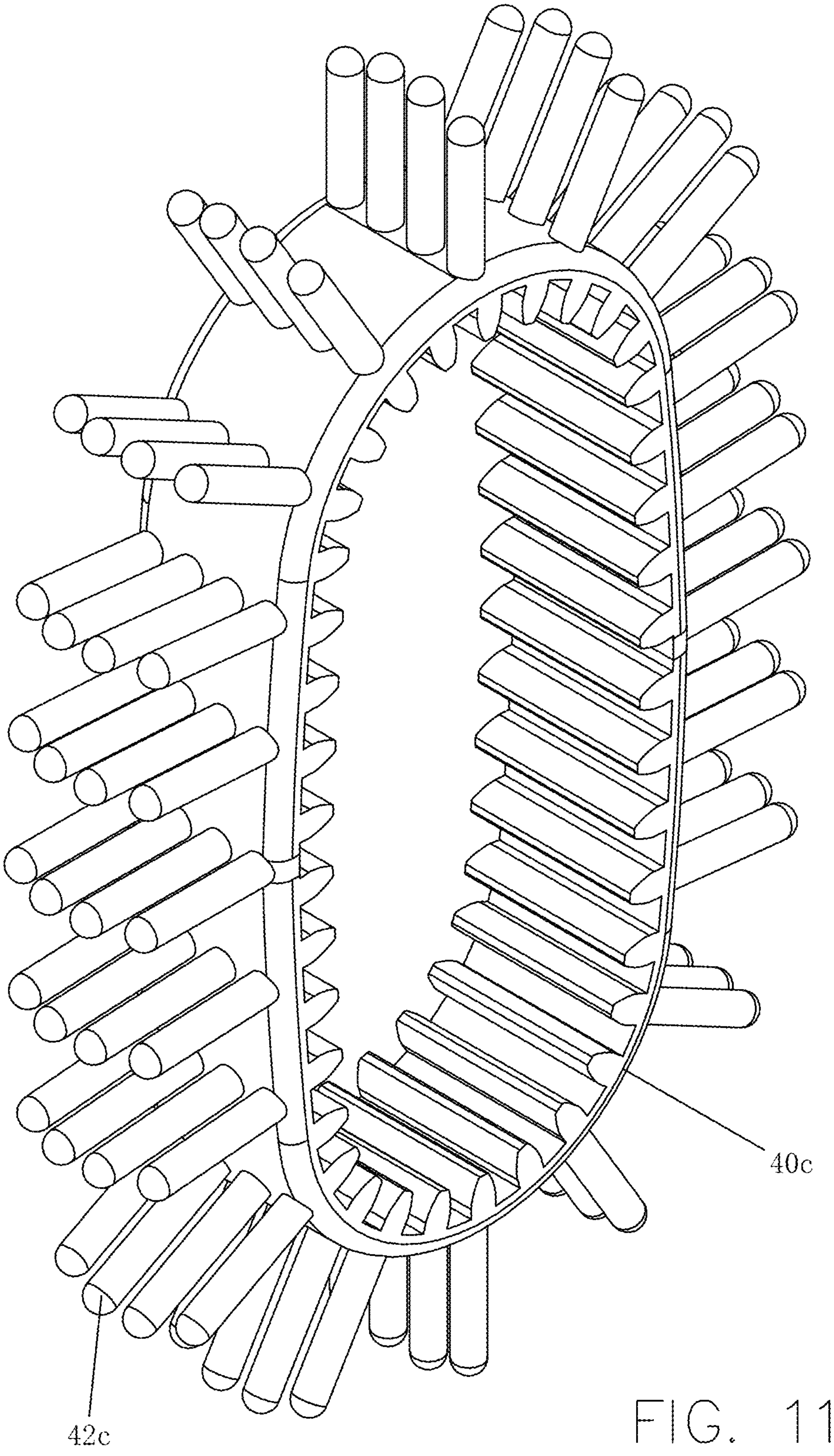
FIG. 11 is a third alternative of the massage member shown in FIG. 8.
Figure 12:
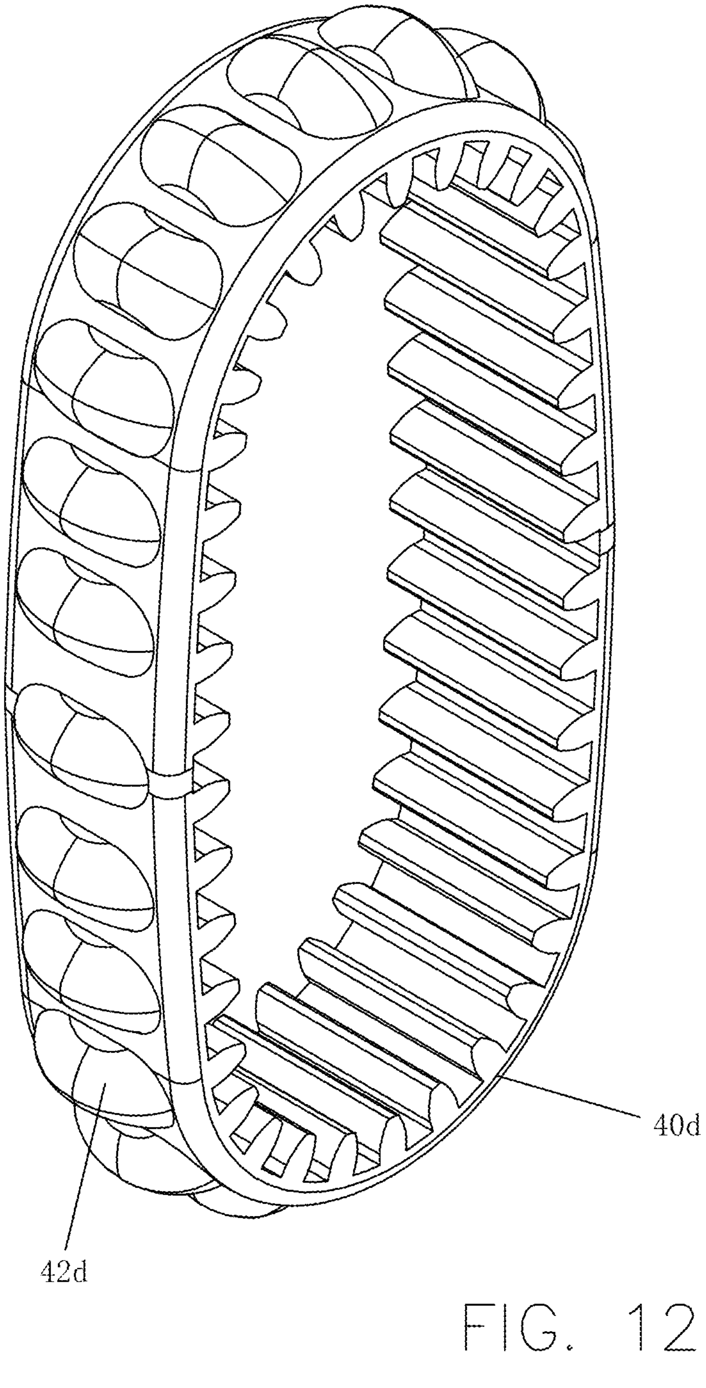
FIG. 12 is a fourth alternative of the massage member shown in FIG. 8.

FIGS. 9 to 12 show alternatives of the massage member 40. As shown in FIG. 9, the protrusions **42*a* on the outer circumference of the massage member 40*a* are shaped like balls. As shown in FIG. 10, the protrusions 42*b* on the outer circumference of the massage member 40*b* are shaped like arc sheets. As shown in FIG. 11, the protrusions 42*c* on the outer circumference of the massage member 40*c* are shaped like pillars. As shown in FIG. 12, the protrusions 42*d* on the outer circumference of the massage member 40*d* are shaped like convex ribs which are shorter and thicker than the convex ribs shown in FIG. 8**.

Referring to FIGS. 6 to 8 again, in the first embodiment, the housing 20 has a double-layer structure, including an inner housing 24 and an outer housing 26 covering the inner housing 24. The hardness of the outer housing 26 is smaller than the hardness of the inner housing 24. The inner housing 24 can be made of hard materials such as plastics or alloys, and has a certain degree of strength, defining an interior space for installing the driving assembly 30 among others. The outer housing 26, as the outermost structure of the entire massage device 100, can be made of flexible materials such as silicone, rubber, etc. that have a soft touch when in contact with the human body. During manufacturing, the driving assembly 30 among others can be installed in the inner housing 24 first, and then the outer housing 26 can be over-molded outside the inner housing 24 by injection molding, which not only simplifies manufacturing and assembly, but also improves the sealing performance of the massage device 100. Preferably, the annular groove 22 is defined by the outer housing 26 and passes through the outer housing 26 in the radial direction. The inner wall of the massage member 40 is slidably engaged with the outer wall of the inner housing 24 so that the massage member 40 can rotate around the housing 20.

Specifically, the massage member 40 includes an inner annular belt 44 and an outer annular belt 46 covering the inner annular belt 44. The hardness of the outer annular belt 46 is smaller than the hardness of the inner annular belt 44. The outer annular belt 46 can be made of flexible materials such as silicone, rubber, etc., and preferably, the protrusions 42 and the outer annular belt 46 are formed in one piece. Alternatively, the outer annular belt 46 can be made of other flexible materials that can directly contact the skin, which are not strictly limited here. The inner annular belt 44 has a certain strength, and its two ends are respectively engaged with the driving wheel 34 and the driven wheel 36. Preferably, the housing 20 (specifically, the inner housing 24) is opened at two ends corresponding to the driving wheel 34 and the driven wheel 36, so that the driving wheel 34 and the driven wheel 36 are at least partially exposed out of the inner housing 24 and can be in direct contact and connected in transmission with the inner annular belt 44. As shown in the FIG. 8, the inner annular belt 44 has a plurality of internal teeth 48 on the inner surface thereof for engaging with the driving wheel 34 and the driven wheel 36.

Specifically, in this embodiment, both the driving wheel 34 and the driven wheel 36 are gears, and the inner annular belt 44 of the massage member 40 meshes with the driving wheel 34 and the driven wheel 36 for transmission. In this way, when the driving motor 32 drives the driving wheel 34 to rotate, the driving wheel 34 drives the massage member 40 engaged with it to rotate, and the massage member 40 drives the driven wheel 36 engaged with it to rotate, so that the massage member 40 can rotate along the outer circumferential surface of the housing 20. As shown in the figure, the driving wheel 34 and the driven wheel 36 are spaced apart in the inner housing 24, and an installation space is defined between them for installing the driving motor 32. The driving motor 32 is arranged in the length direction of the housing 20 (in the major axis of the elliptical massage member 40), and its rotating shaft 33 is arranged at an angle to the central axis of the driving wheel 34, preferably perpendicularly to the central axis of the driving wheel 34. In this way, the space in the length direction can be fully utilized and the overall size of the massage device 100 can be reduced.

Preferably, a gear set 38 is provided between the driving motor 32 and the driving wheel 34. As a transmission mechanism, the gear set 38 can not only transmit the torque from the driving motor 32 to the driving wheel 34, but also change the direction of torque transmission as needed. Specifically, the gear set 38 includes two bevel gears meshing with each other, so that a 90-degree change in direction can be achieved through the cooperation of the two bevel gears.

In this illustrated embodiment, the gear set 38 includes a first gear 381, a second gear 383, a third gear 385, a fourth gear 387 and a fifth gear 389. The rotating shaft 33 of the driving motor 32 is inserted into the first gear 381, and the two are preferably coaxially arranged. The second gear 383 meshes with the first gear 381, and preferably the first gear 381 and the second gear 383 are bevel gears. The third gear 385 and the second gear 383 are arranged coaxially, and preferably the two are formed in one piece, wherein the diameter of the third gear 385 is larger than the diameter of the second gear 383. The fourth gear 387 meshes with the third gear 385, and preferably the diameter of the fourth gear 387 is smaller than the diameter of the third gear 385. The fifth gear 389 and the fourth gear 387 are coaxially arranged, and the two are preferably formed in one piece, wherein the diameter of the fifth gear 389 is larger than the diameter of the fourth gear 387. The driving wheel 34 meshes with the fifth gear 389, and the diameter of the driving wheel 34 is smaller than the diameter of the fifth gear 389.

Through the gear set 38, the torque transmission direction can be changed and the rotation speed can also be reduced. After the high-speed rotation of the driving motor 32 is decelerated step by step, the driving wheel 34 is driven to rotate at an appropriate speed, thereby driving the massage member 40 to rotate around the housing 20 at an appropriate speed. It should be understood that the quantity, structure, size, etc. of the gears in the gear set 38 can be adjusted as needed. In addition, other transmission mechanisms can also be provided between the driving motor 32 and the driving wheel 34, such as worm gears, pulleys, etc., or a combination of multiple transmission mechanisms can be provided between the driving motor 32 and the driving wheel 34. That is, the transmission mechanism between the driving motor 32 and the driving wheel 34 is not limited to the gear transmission shown in the figure. Furthermore, in some embodiments, the driving motor 32 can also directly drive the driving wheel 34 to rotate, removing the transmission mechanism.

FIGS. 13 to 18 show a massage device 200 for sexual purpose according to a second embodiment. The massage device 200 according to the second embodiment is similar to the massage device 100 according to the first embodiment. The similarities between the two will no longer be repeated here, and the following will main explain the differences between the two.

Figure 13:
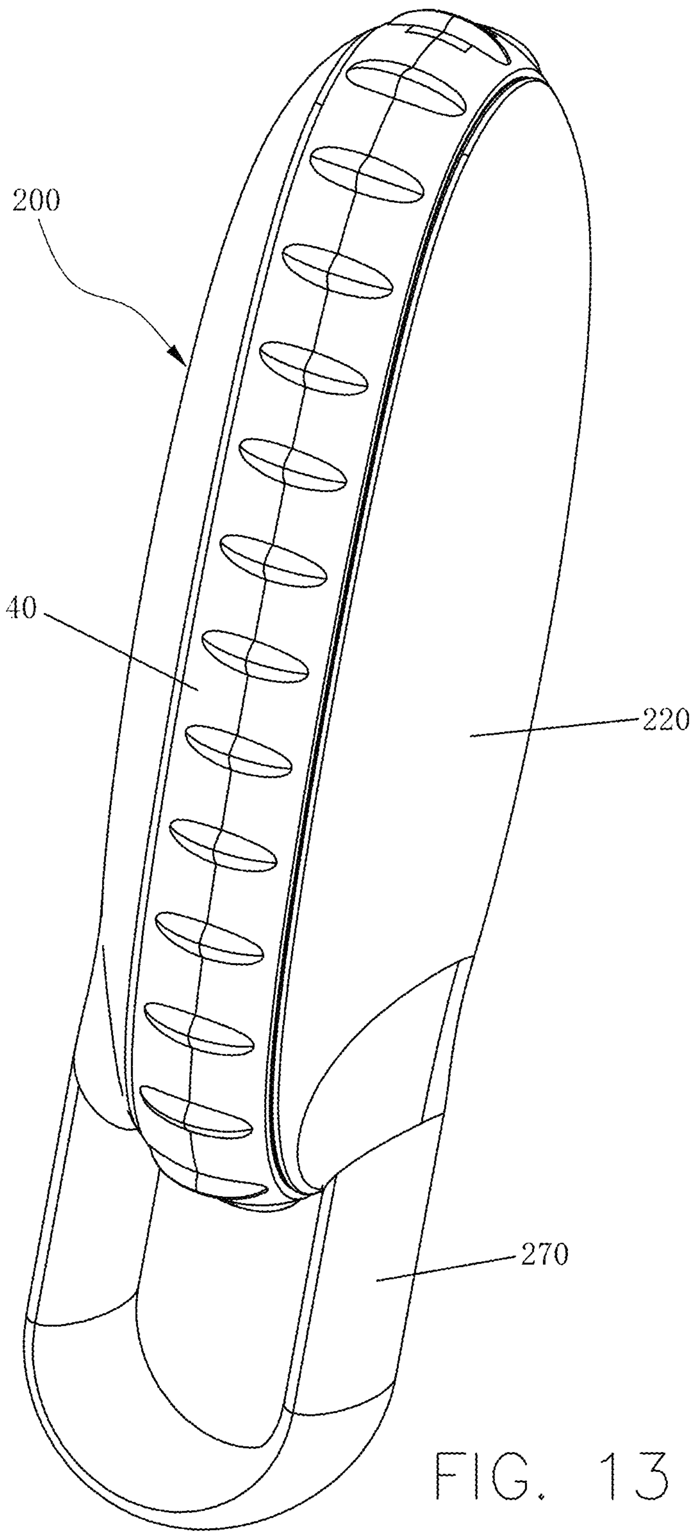
FIG. 13 is a perspective view of a second embodiment of a massage device of the present disclosure.
Figure 14:
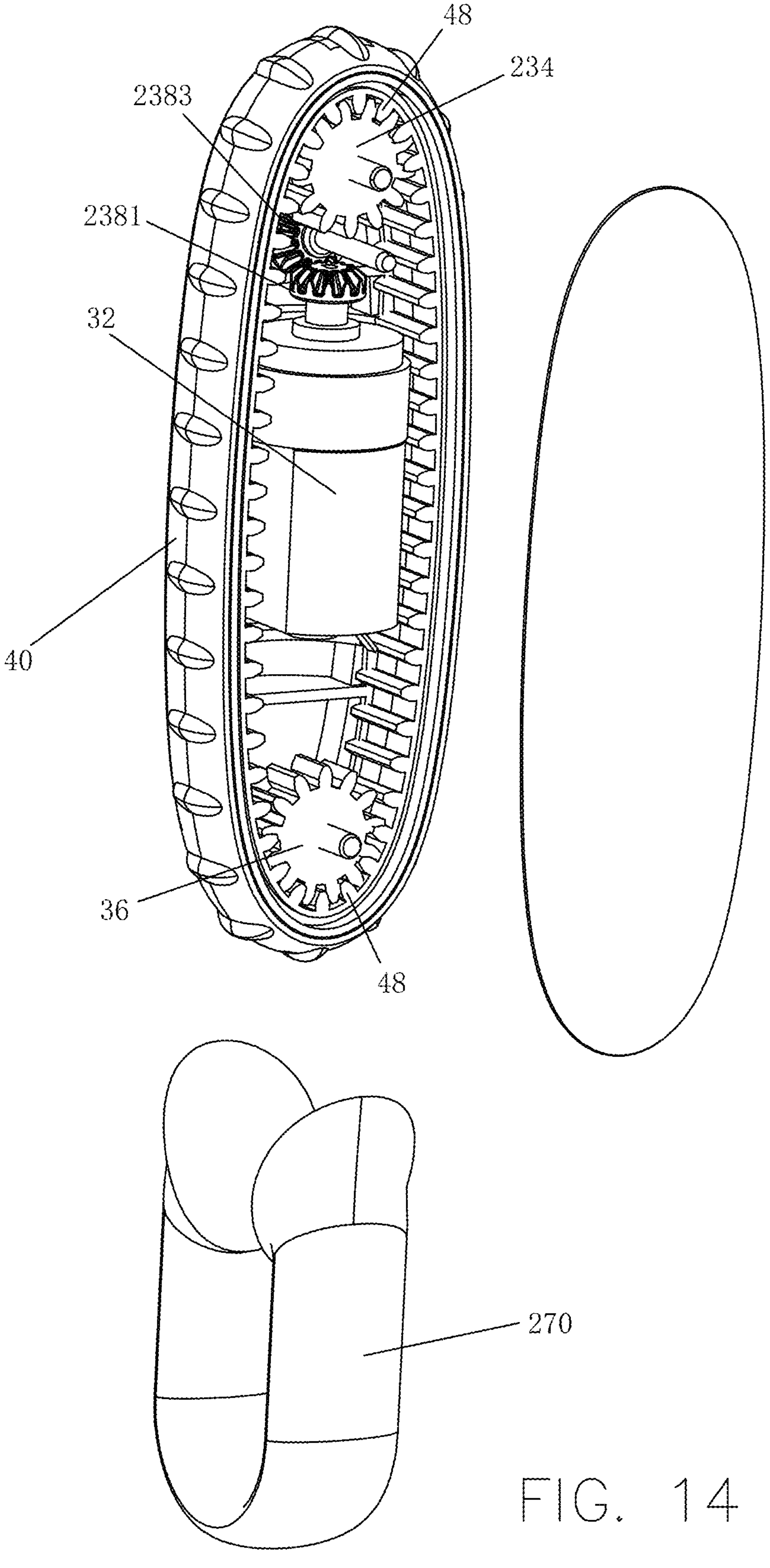
FIG. 14 is an exploded view of the massage device shown in FIG. 13.
Figure 15:
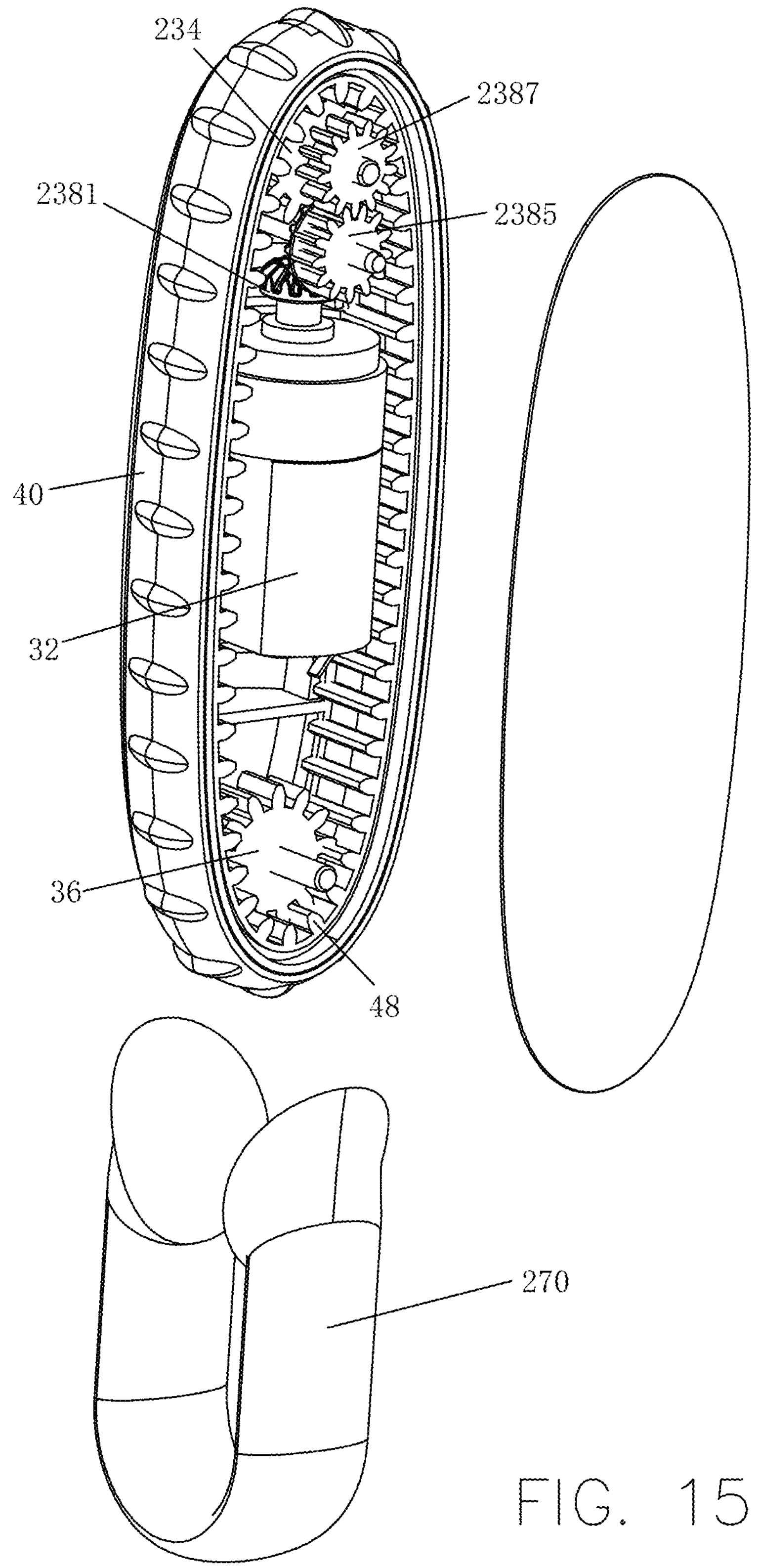
FIG. 15 is an exploded view of the massage device shown in FIG. 13 from another perspective.

As shown in FIGS. 13 to 15, the massage device 200 according to the second embodiment further includes a handle 270 connected to the housing 220 so that the user can easily take the massage device 200 from the vagina or the rectum. In this embodiment, the handle 270 is generally U-shaped, and two ends of the handle 270 are respectively connected to two sides of the housing 220. It can be understood that in other embodiments, the handle 270 can have other shapes and configurations. For example, the handle 270 can be generally rod-shaped and connected to one side of the housing 220.

Figure 16:
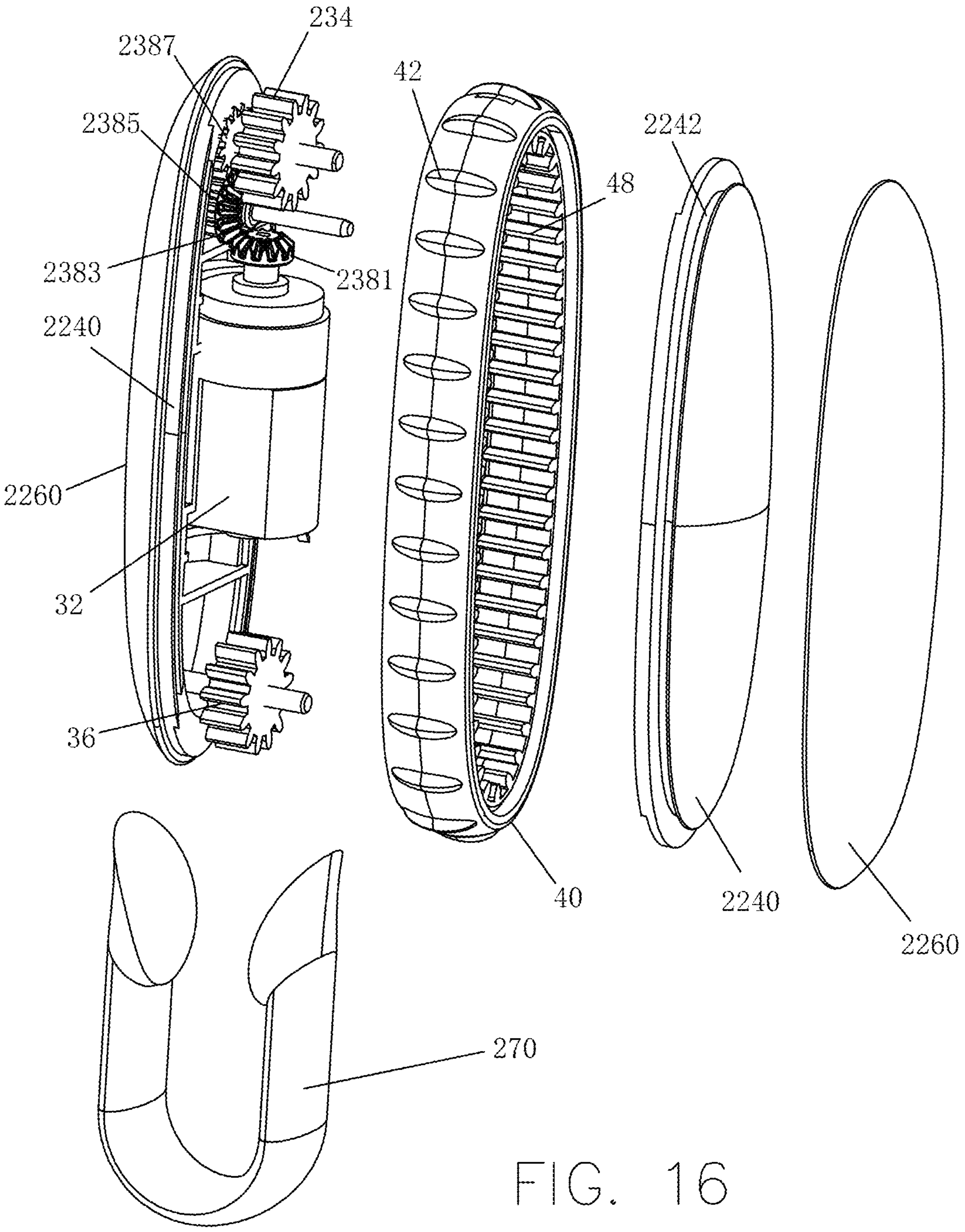
FIG. 16 is a further exploded view of the massage device shown in FIG. 13.
Figure 17:
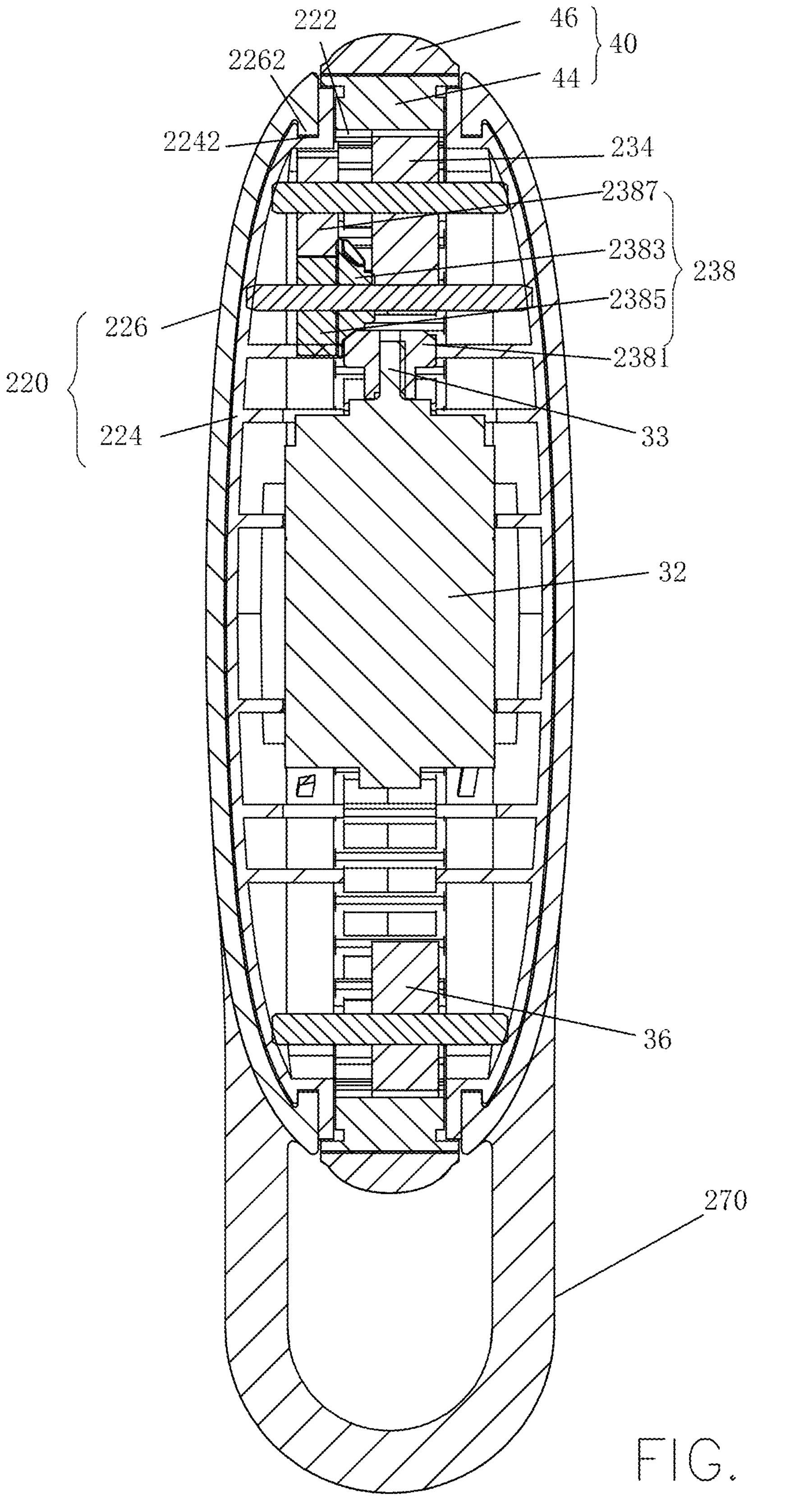
FIG. 17 is a cross-sectional view of the massage device shown in FIG. 13.

Referring to FIGS. 16 and 17, the housing 220 in the second embodiment includes an inner housing 224 and an outer housing 226 covering the inner housing 224. The outer housing 226 has a hardness smaller than that of the inner housing 224. In this embodiment, the inner housing 224 includes two separate inner housing halves 2240, and the outer housing 226 includes two separate outer housing halves 2260, wherein one outer housing half 2260 covers a corresponding inner housing half 2240. Specifically, the outer housing half 2260 has an annular flange 2262 on the inner side edge thereof, and the inner housing half 2240 defines an annular recession 2242 on the outer side edge thereof for receiving the annular flange 2262, so that the outer housing half 2260 and the inner housing half 2240 are assembled together. In this embodiment, the annular groove 222 for receiving the massage member 40 is defined between the housing halves (between one assembly of one outer housing half 2260 and the corresponding inner housing half 2240 and the other assembly of the other outer housing half 2260 and the corresponding inner housing half 2240). Therefore, the annular groove 222 can be considered as passing through both the inner housing 224 and the outer housing 226.

Figure 18:
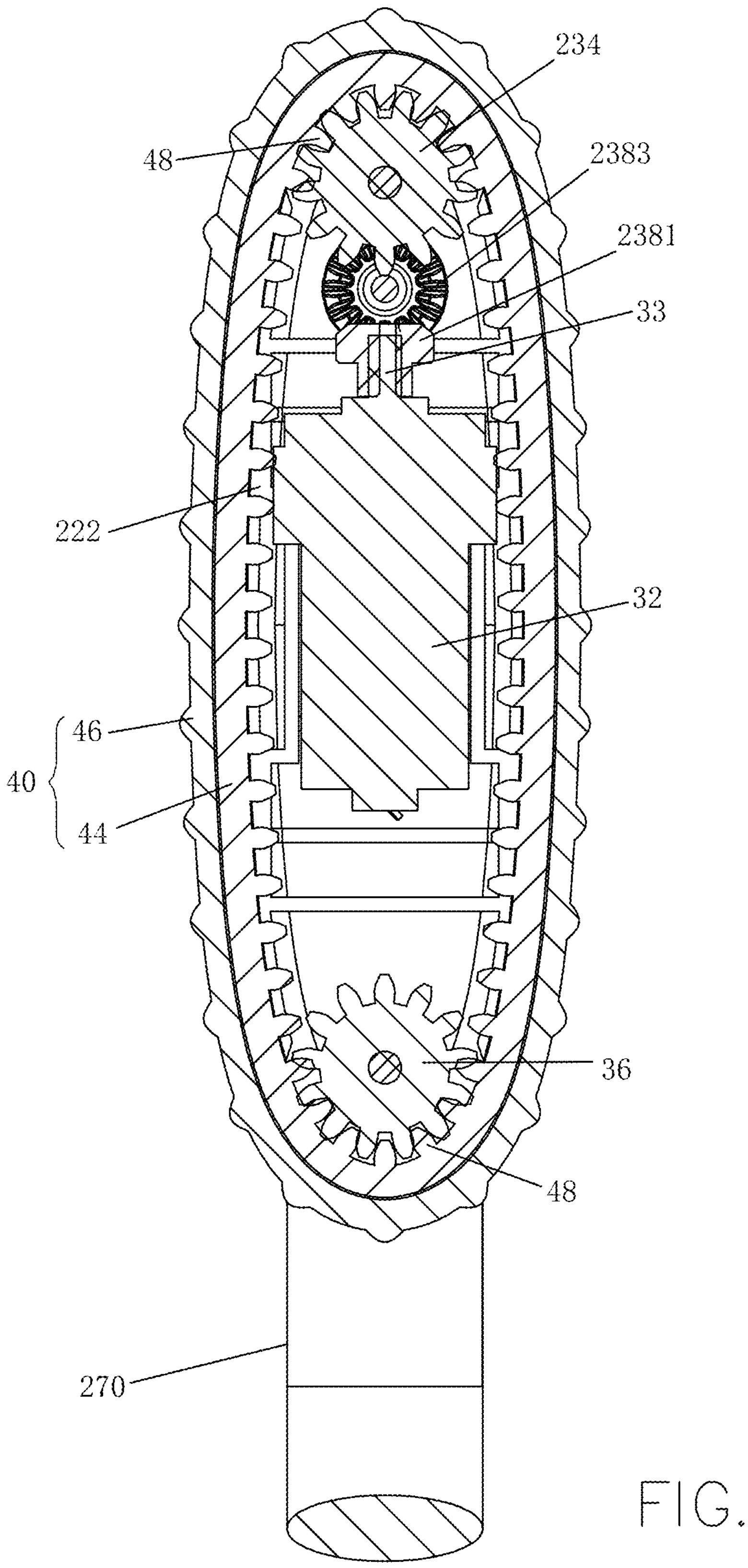
FIG. 18 is another cross-sectional view of the massage device shown in FIG. 13.
Figure 19:
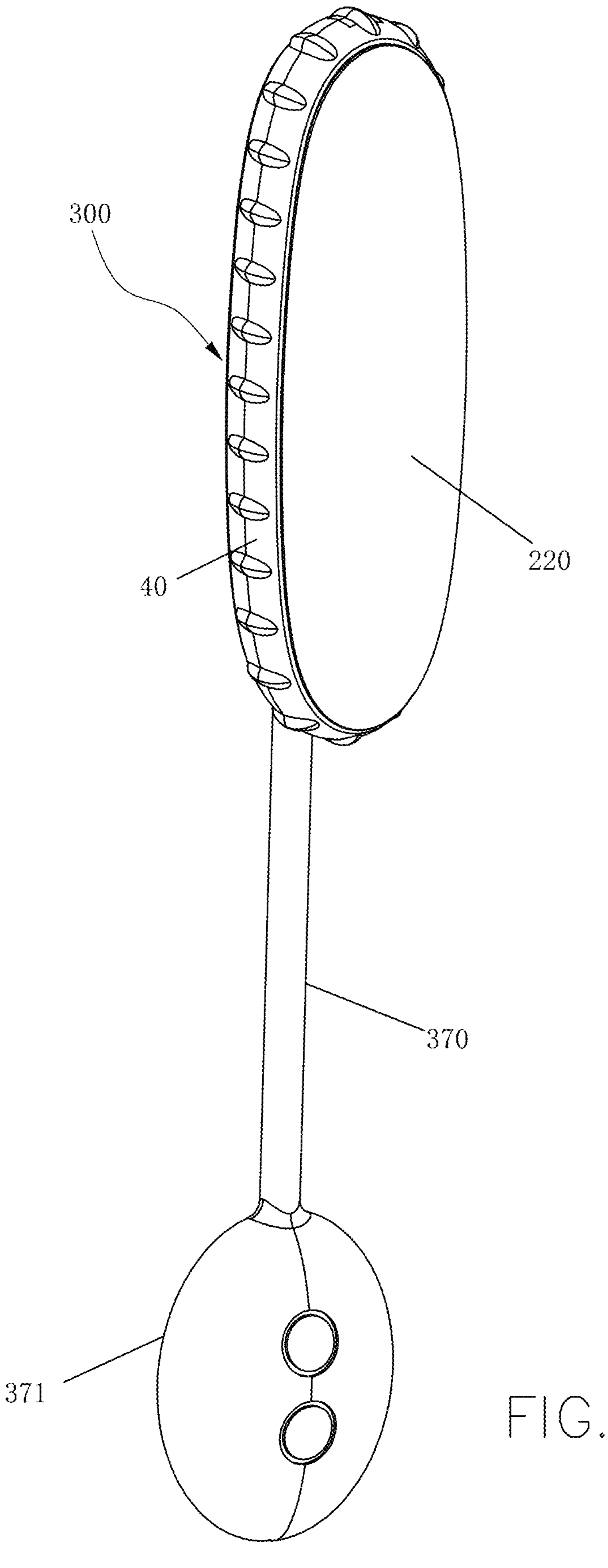
FIG. 19 is a perspective view of a third embodiment of a massage device of the present disclosure.
Figure 20:
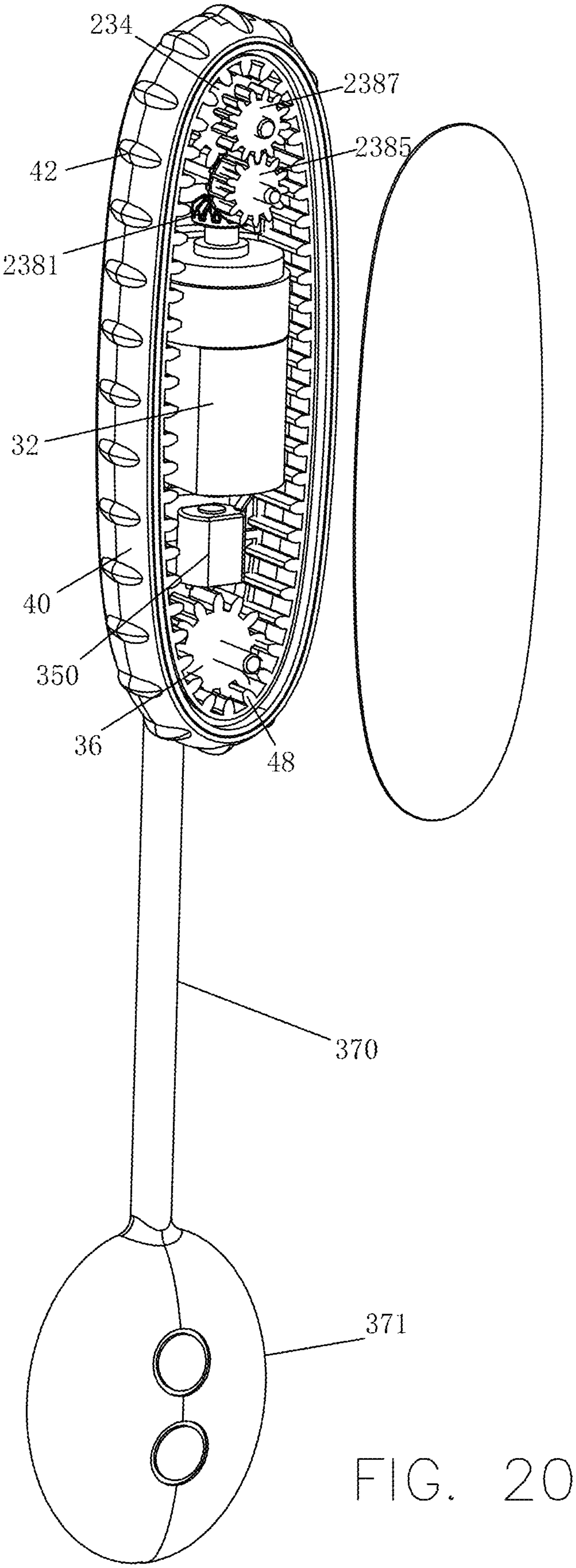
FIG. 20 is an exploded view of the massage device shown in FIG. 19.
Figure 21:
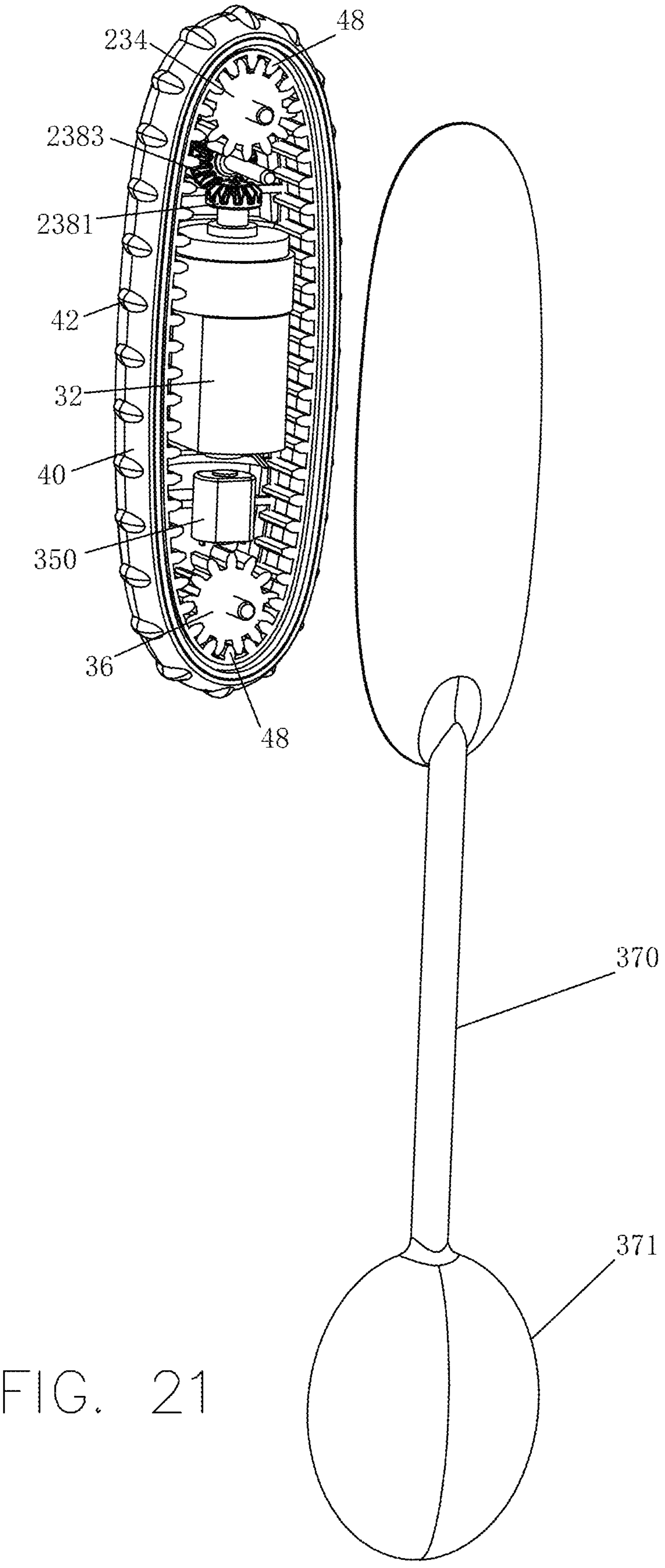
FIG. 21 is an exploded view of the massage device shown in FIG. 19 from another perspective.
Figure 22:
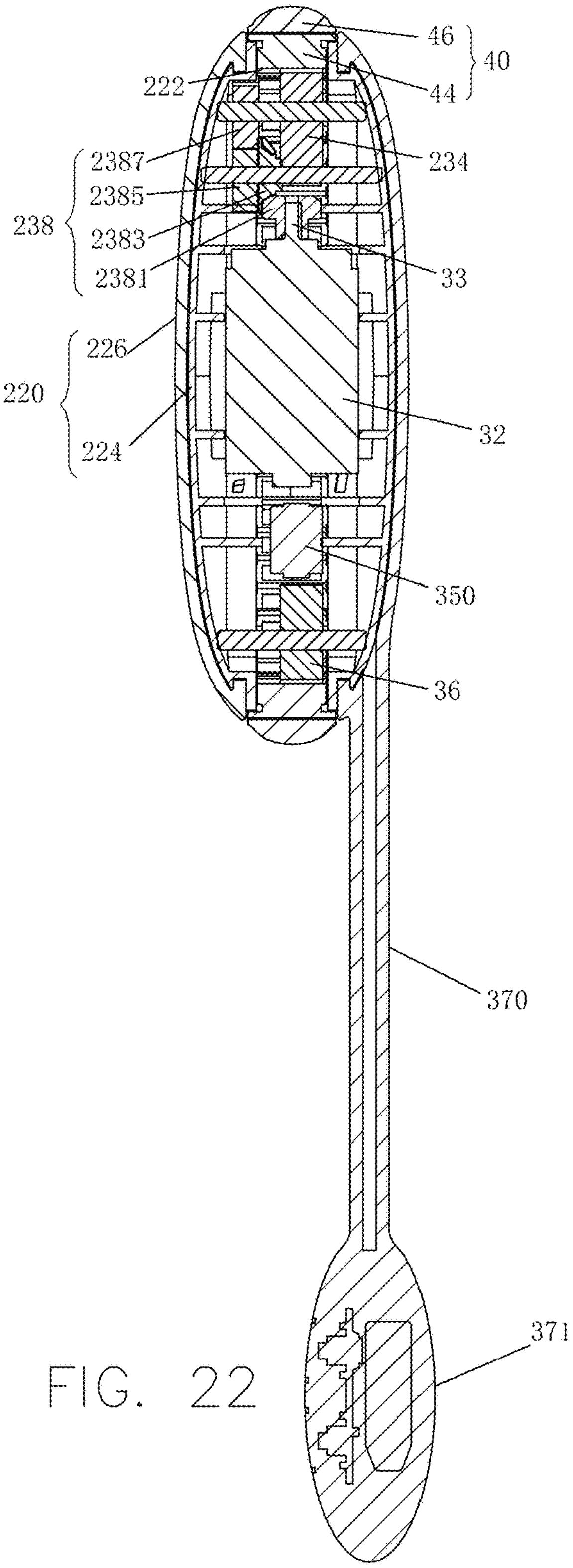
FIG. 22 is a cross-sectional view of the massage device shown in FIG. 19.
Figure 23:
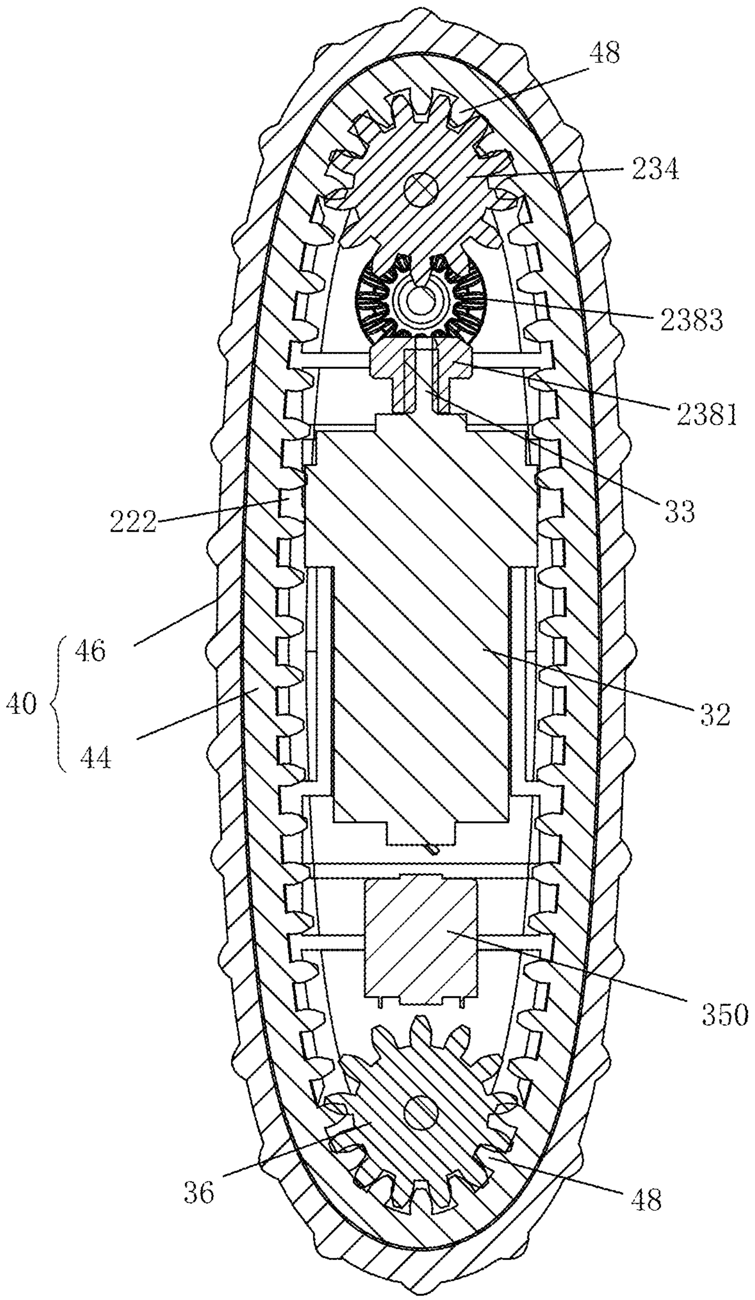
FIG. 23 is another cross-sectional view of the massage device shown in FIG. 19.

Referring to FIGS. 16 to 18, in the second embodiment, the gear set 238 includes a first gear 2381, a second gear 2383, a third gear 2385, and a fourth gear 2387. The rotating shaft 33 of the driving motor 32 is inserted into the first gear 2381, and the two are preferably coaxially arranged. The second gear 2383 meshes with the first gear 2381, and preferably the first gear 2381 and the second gear 2383 are bevel gears. The third gear 2385 and the second gear 2383 are arranged coaxially, and preferably the two are formed in one piece, wherein the diameter of the third gear 2385 is generally the same as the diameter of the large end of the second gear 2383. The fourth gear 2387 meshes with the third gear 2385, and preferably the diameter of the fourth gear 2387 is generally the same as the diameter of the third gear 2385. The driving wheel 234 and the fourth gear 2387 are coaxially arranged, and the two are preferably formed in one piece, wherein the diameter of the driving wheel 234 is larger than the diameter of the fourth gear 2387. The driving wheel 234 meshes with the internal teeth 48 of the massage member 40. When the driving motor 32 drives the driving wheel 234 through the gear set 238 to rotate, the driving wheel 234 drives the massage member 40 engaged with it to rotate, and the massage member 40 drives the driven wheel 36 engaged with it to rotate, so that the massage member 40 can rotate along the outer circumferential surface of the housing 220.

FIGS. 19 to 23 show a massage device 300 for sexual purpose according to a third embodiment. The massage device 300 according to the third embodiment is similar to the massage device 200 according to the second embodiment. The similarities between the two will no longer be repeated here, and the following will main explain the differences between the two.

As shown in FIGS. 19 to 22, the massage device 300 according to the third embodiment further includes a pull rope 370, instead of the handle 270, connected to the housing 220 so that the user can easily take the massage device 300 from the vagina or the rectum. In this embodiment, the pull rope 370 is elongate and connected to one side of the housing 220. It can be understood that in other embodiments, the pull rope 370 can have other shapes and configurations. For example, the pull rope 370 can be generally U-shaped and connected to two sides of the housing 220.

Optionally, the free end of the pull rope 370 opposing to the housing 220 can be provided with a control portion 371 in which a control board among others can be disposed and coupled to the driving motor 32 among others, so that the user can control the driving motor 32 among others through the control portion 371.

Preferably, referring to FIGS. 20 to 23, the massage device 300 according to the third embodiment further includes a vibration member 350 disposed in the housing 220, in order to further improve the stimulation effect. For example, the vibration member 350 can be a vibration motor.

Figure 24:
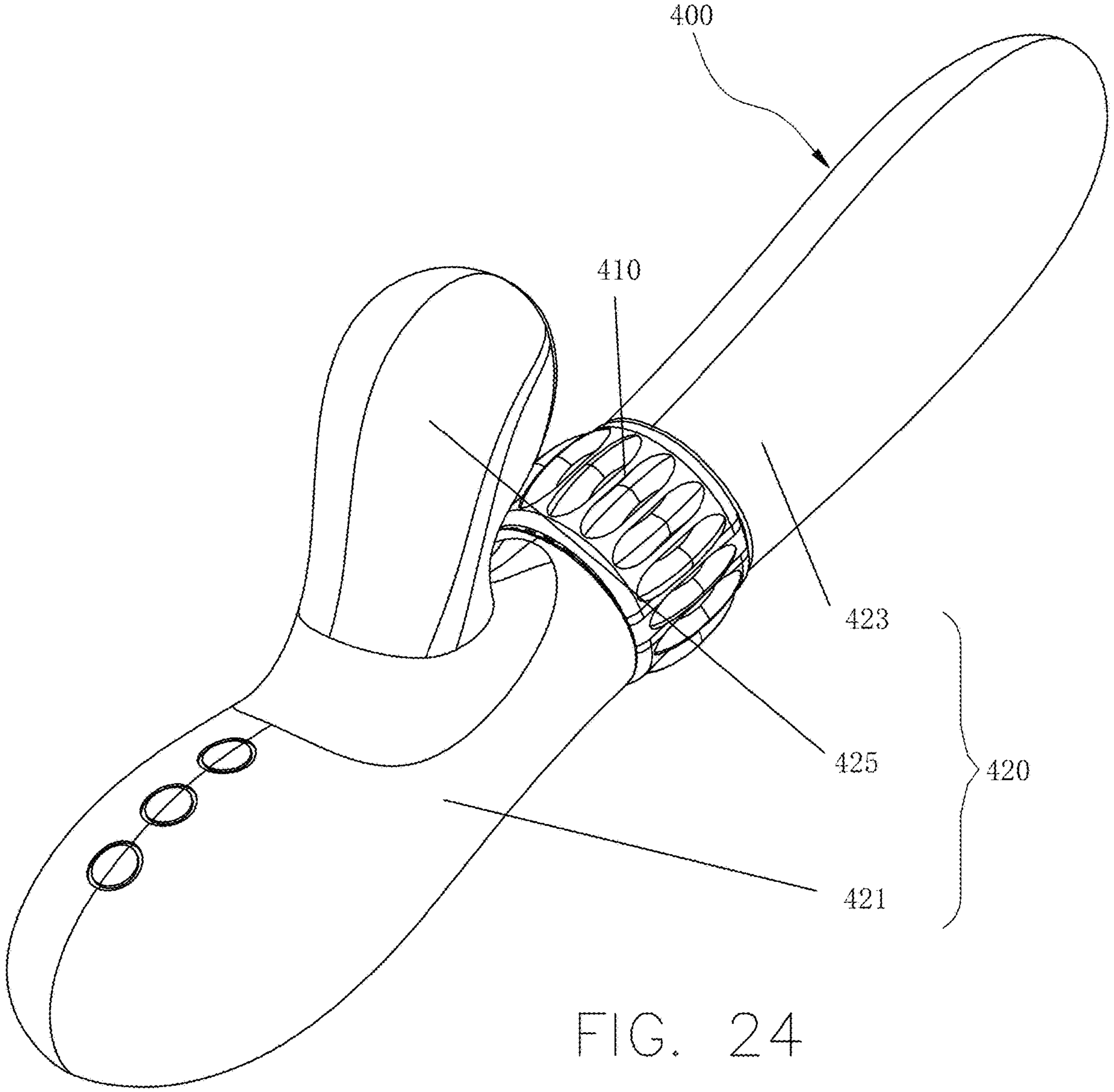
FIG. 24 is a perspective view of a fourth embodiment of a massage device of the present disclosure.
Figure 25:
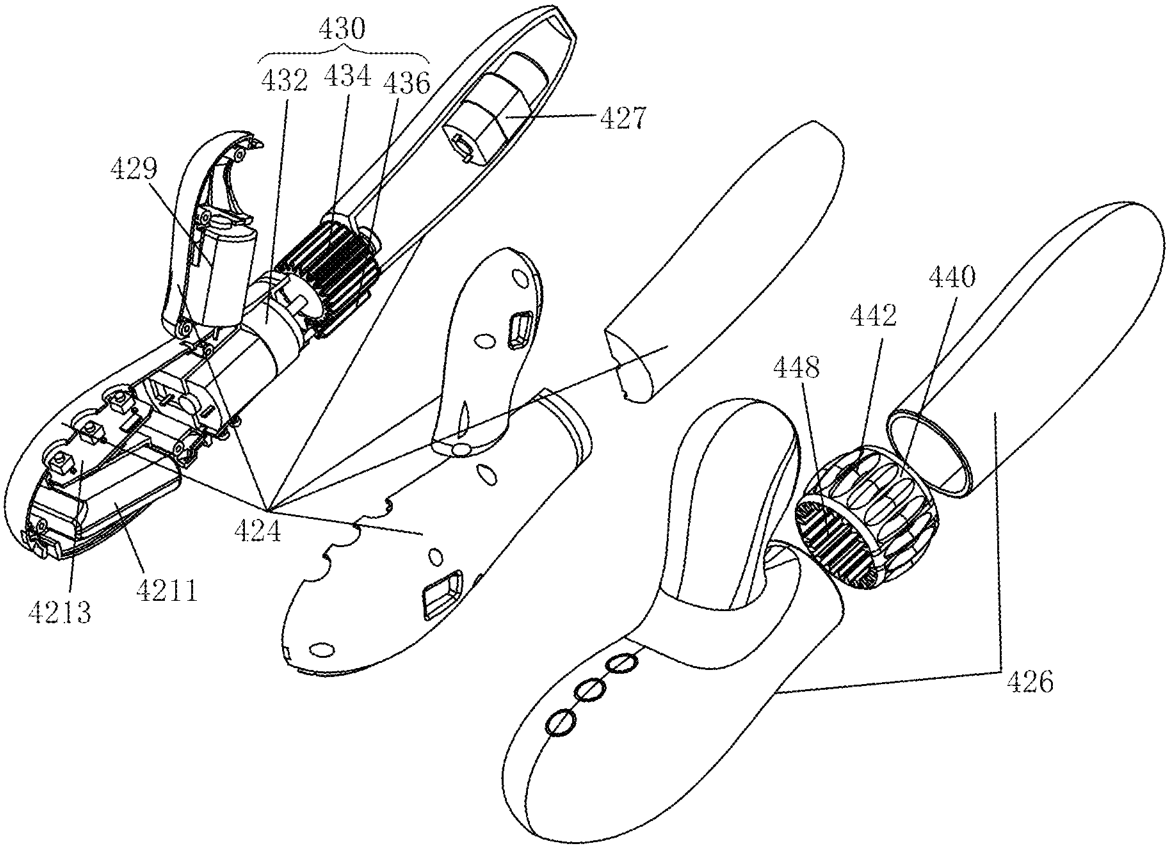
FIG. 25 is an exploded view of the massage device shown in FIG. 24.
Figure 26:
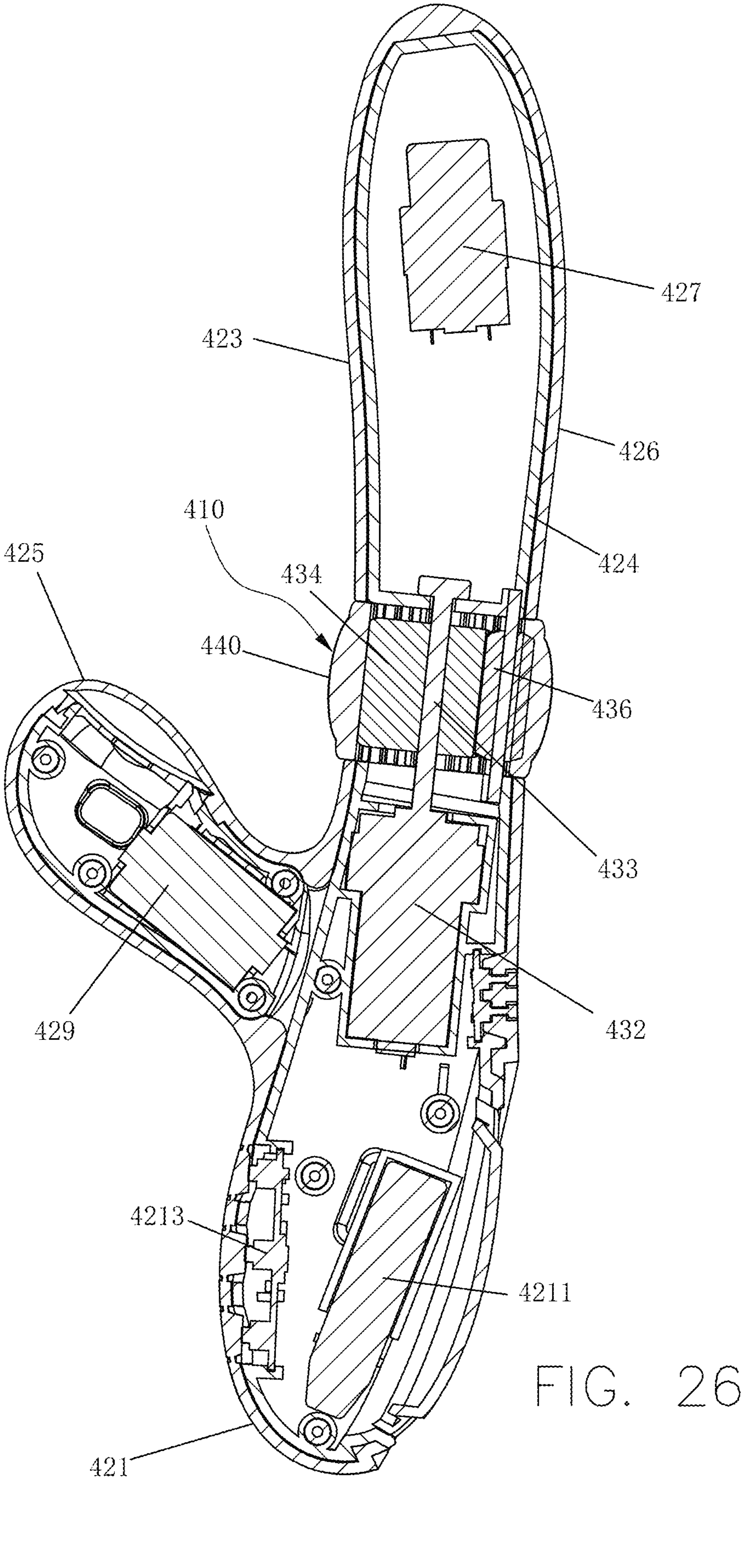
FIG. 26 is a cross-sectional view of the massage device shown in FIG. 24.
Figure 27:
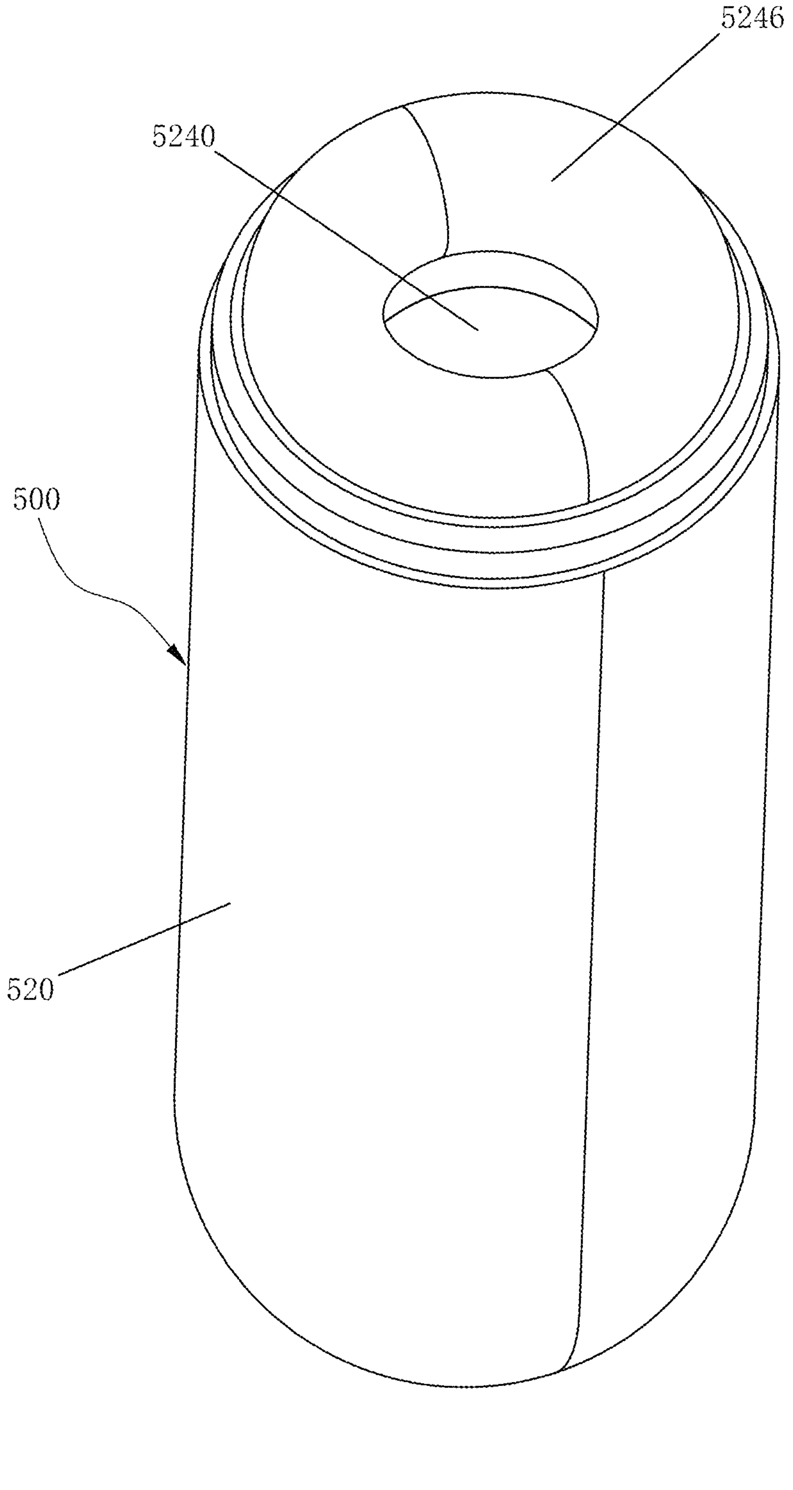
FIG. 27 is a perspective view of a fifth embodiment of a massage device of the present disclosure.
Figure 28:
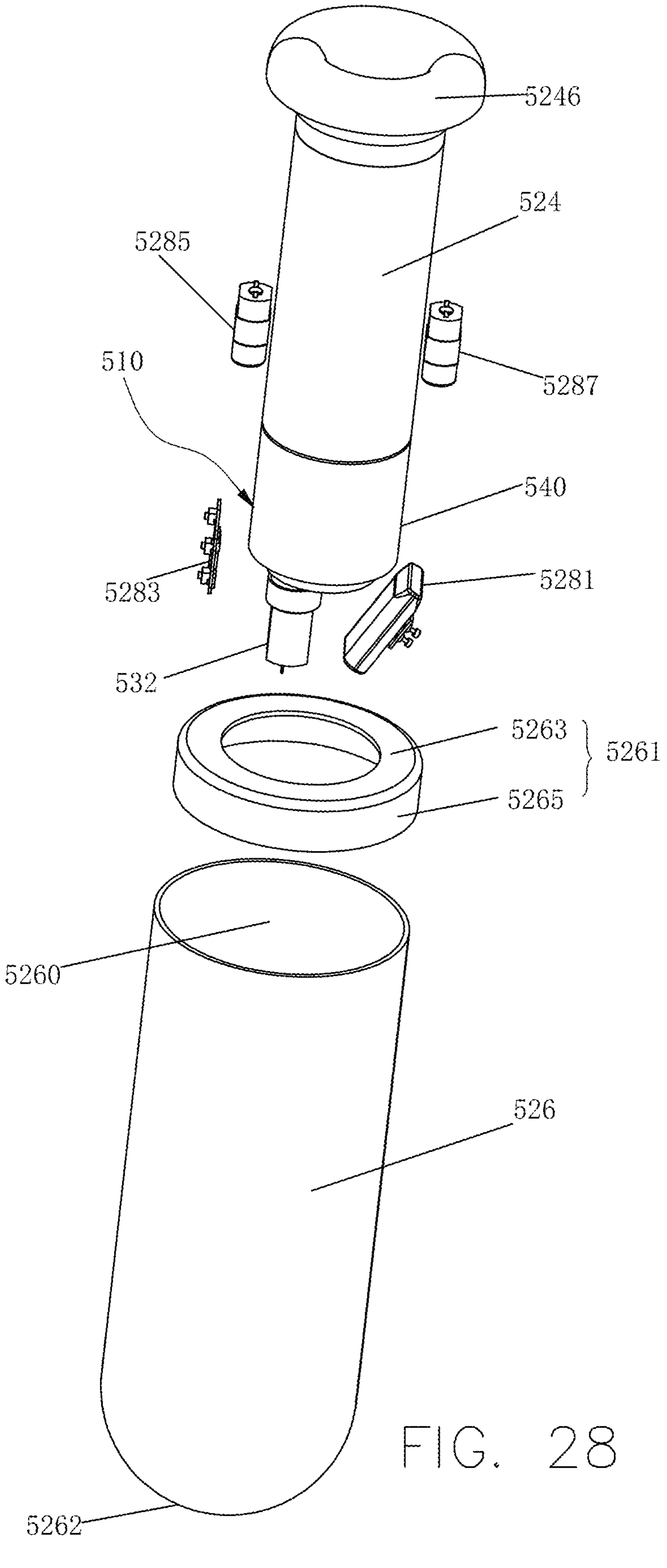
FIG. 28 is an exploded view of the massage device shown in FIG. 27.

FIGS. 24 to 26 show a massage device 400 for sexual purpose according to a fourth embodiment. Similar to the massage device 100 according to the first embodiment, the massage device 400 according to the fourth embodiment also includes a housing 420 and a massage assembly 410 provided on the housing 420. The massage assembly 410 includes a driving assembly 430 disposed in the housing 420 and a massage member 440. The driving assembly 430 includes a driving source, for example, a driving motor 432, a driving wheel 434 connected to the driving motor 432 and a driven wheel 436 for cooperating with the driving wheel 434. The massage member 440 surrounds and is engaged with the driving wheel 434 and the driven wheel 436. The driving motor 432 is configured to drive the massage member 440 to rotate through the driving wheel 434.

Similar to the housing 20 in the first embodiment, the housing 420 in the fourth embodiment also includes an inner housing 424 and an outer housing 426 covering the inner housing 424. The outer housing 426 has a hardness smaller than that of the inner housing 424. For example, the outer housing 426 can be made of flexible materials, such as silicon rubber, which can contact the skin directly. The inner housing 424 can be made of materials with a certain strength, such as plastic, to provide support for the outer housing 426. However, as shown in the figures, the shape and configuration of the housing 420 is different from that of the housing 20. Specifically, in this embodiment, the housing 420 includes a handle part 421, a stick-like part 423 generally coaxially connected to the front end of the handle part 421, and a branched part 425 obliquely connected to the front end of the handle part 421. The driving motor 432 can be arranged in the handle part 421. Optionally, battery 4211, PCB control board 4213 among others can be arranged in the handle part 421. The stick-like part 423 is configured to be inserted into the vagina or the rectum. Preferably, the stick-like part 423 is provided with a first vibration member 427 such as s vibration motor therein, in order to improve the stimulation effect. The branched part 425 is configured to stimulate the external genitalia region, such as the clitoris. Preferably, the branched part 425 is provided with a second vibration member 429 such as a vibration motor therein, in order to improve the stimulation effect.

Similar to the massage member 40 in the first embodiment, the massage member 440 in the fourth embodiment is also configured to rotate along the outer circumferential surface of the housing 420 to stimulate the vagina or the rectum. Further, the massage member 440 is also provided with a plurality of protrusions 442 which protrude outwardly on the outer surface thereof in order to improve the stimulation effect. However, as shown in FIG. 25, the massage member 440 is generally shaped like a circular ring with a plurality of internal teeth 448 on the inner surface thereof engaged with the driving wheel 434 and the driven wheel 436, instead of an elliptical ring. Optionally, the massage member 440 in this embodiment consists of only one annular belt, instead of two annular belts. In this embodiment, the massage member 440 is connected between the handle part 421 and the stick-like part 423. It can be understood that in other embodiments, the massage member 440 can have different arrangement. For example, the massage member 440 can be arranged at the middle of the stick-like part 423 or near the front end of the stick-like part 423, instead of the rear end of the stick-like part 423 as shown in the figures.

As shown in the figures, the driving assembly 430 in the fourth embodiment does not include a gear set between the driving motor 432 and the driving wheel 434. Instead, in this embodiment, the rotating shaft 433 of the driving motor 432 is directly coaxially connected to the driving wheel 434. That is, the rotation axis of the rotating shaft 433 of the driving motor 432 is parallel to the rotation axis of the driving wheel 434. Similar to the first embodiment, the driving wheel 434 and the driven wheel 436 are also gears. As shown in the figure, the rotating shaft 433 of the driving motor 432 pass through the driving wheel 434 and is connected with the stick-like part 423 so as to connect the handle part 421, the stick-like part 423 and the massage member 440 between the handle part 421 and the stick-like part 423. When the driving motor 432 drives the driving wheel 434 to rotate, the driving wheel 434 drives the massage member 440 engaged with it to rotate, and the massage member 440 drives the driven wheel 436 engaged with it to rotate, so that the massage member 440 can rotate along the outer circumferential surface of the housing 420.

FIGS. 27 to 30 show a massage device 500 for sexual purpose according to a fifth embodiment. Similar to the massage device 100 according to the first embodiment, the massage device 500 according to the fifth embodiment also includes a housing 520 and a massage assembly 510 provided on the housing 520. The massage assembly 510 includes a driving assembly 530 disposed in the housing 520 and a massage member 540. The driving assembly 530 includes a driving source, for example, a driving motor 532, a driving wheel 534 connected to the driving motor 532 and at least one driven wheel 536 for cooperating with the driving wheel 534. The massage member 540 surrounds and is engaged with the driving wheel 534 and the at least one driven wheel 536. The driving motor 532 is configured to drive the massage member 540 to rotate through the driving wheel 534.

Similar to the housing 20 in the first embodiment, the housing 520 in the fifth embodiment also includes an inner housing 524 and an outer housing 526 covering the inner housing 524. However, in this embodiment, the inner housing 524 has a hardness smaller than that of the outer housing 526. For example, the inner housing 524 can be made of flexible materials, such as silicon rubber, which can contact the skin directly. The outer housing 526 can be made of materials with a certain strength, such as plastic. In this embodiment, the outer housing 526 is shaped like a hollow cylinder with an open end 5260 and an opposing close end 5262. The inner housing 524 is received in the outer housing 526 and shaped like a hollow cylinder with openings 5240, 5242 at two ends. The interior of the inner housing 524 is an elongate axial space 5244 for receiving the penis and communicated with the openings 5240, 5242 at two ends. Preferably, a flexible ring 5246 is provided at the first opening 5240 of the inner housing 524 and the open end 5260 of the outer housing 526, in order to provide a comfort feel. Preferably, the material of the flexible ring 5246 in contact with the skin is the same as that of the inner housing 524, for example silicon rubber. In order to enhance the connection between the flexible ring 5246 and the outer housing 526, a fixing ring 5261 is provided therebetween. Specifically, the fixing ring 5261 includes an inner flange 5263 and a side wall 5265 connected to the outer edge of the inner flange 5263. The inner flange 5263 is fixedly connected to the flexible ring 5246 and the side wall 5265 is fixedly connected to the outer housing 526. As shown in the FIG. 30, a chamber 528 is defined between the outer housing 526 and the inner housing 524. Optionally, battery 5281, PCB control board 5283 among others can be arranged in the chamber 528. Preferably, one or more vibration members can be arranged in the chamber 528. As shown in the figure, in this embodiment, a first vibration member 5285 and a second vibration member 5287 are respectively arranged at two opposite sides of the inner housing 526. The vibration member is preferably vibration motor.

Similar to the massage member 40 in the first embodiment, the massage member 540 in the fourth embodiment is shaped like a ring with a plurality of internal teeth 548 engaged with the driving wheel 534 and the at least one driven wheel 536. However, the massage member 540 in this embodiment is shaped like a circular ring, instead of an elliptical ring, and the massage member 540 in this embodiment is disposed in the housing 520 to stimulate the penis received in the elongate axial space 5244 of the housing 520. Specifically, the massage member 540 is coaxially arranged at the second opening 5242 of the inner housing 524 opposing to the first opening 5240, and the interior space of the massage member 540 is communicated with the elongate axial space 5244 of the inner housing 524. The massage member 540 is also provided with a plurality of protrusions 542. However, the protrusions 542 are provided on the inner surface of the massage member 540, instead of the outer surface of the massage member 540. Specifically, the massage member 540 includes an inner annular belt 544 and an outer annular belt 546 surrounding the inner annular belt 544. For example, one of the inner annular belt 544 and the outer annular belt 546 can be provided with one or more ribs 5440 and the other can be provided with one or more slots 5460 for receiving the one or more ribs 5440, thereby connecting the inner annular belt 544 and the outer annular belt 546. The hardness of the outer annular belt 546 is smaller than the hardness of the inner annular belt 544. The outer annular belt 546 can be made of flexible materials such as silicone, rubber, etc. One section of the outer annular belt 546 is connected with the inner annular belt 544 and the other section has the protrusions 542 on the inner surface thereof. Preferably, the protrusions 542 and the outer annular belt 546 are formed in one piece. The inner annular belt 544 has a certain strength, for example, can be made of plastic. The internal teeth 548 are provided on the inner surface of the inner annular belt 544 and engaged with the driving wheel 534 and the driven wheel 536.

Figure 29:
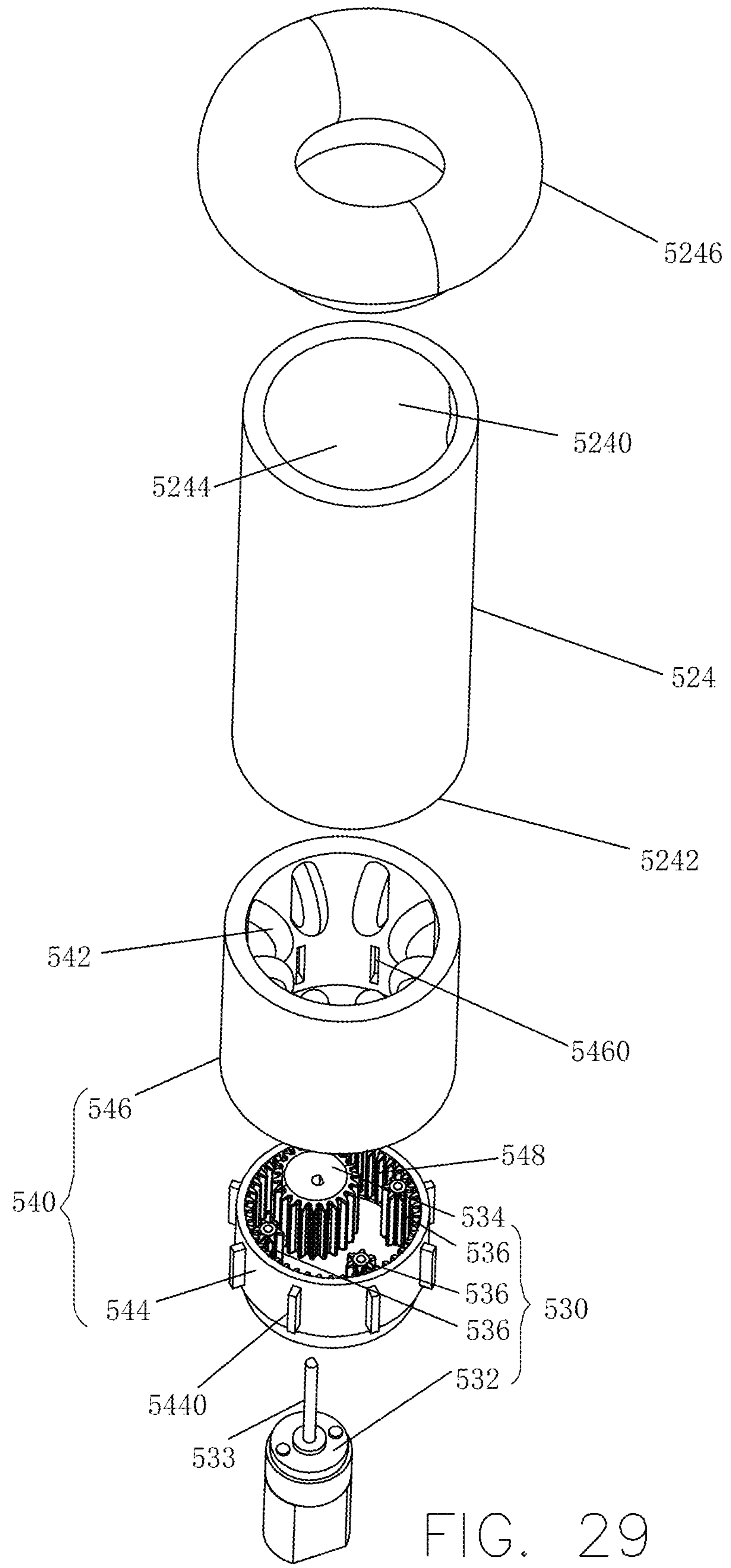
FIG. 29 is an exploded view of the internal structure of the massage device shown in FIG. 28.
Figure 30:
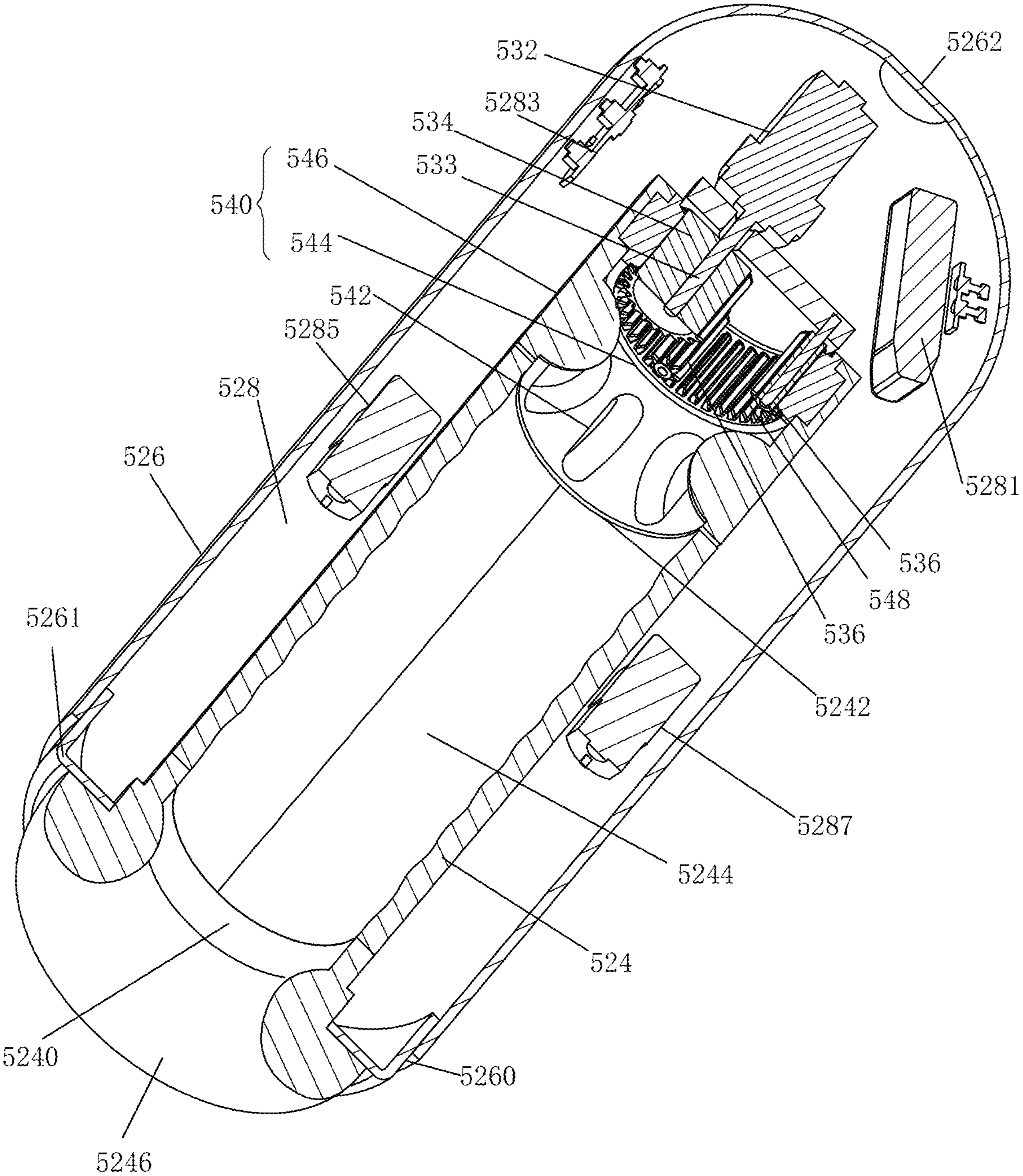
FIG. 30 is a cross-sectional view of the massage device shown in FIG. 27.
Figure 31:
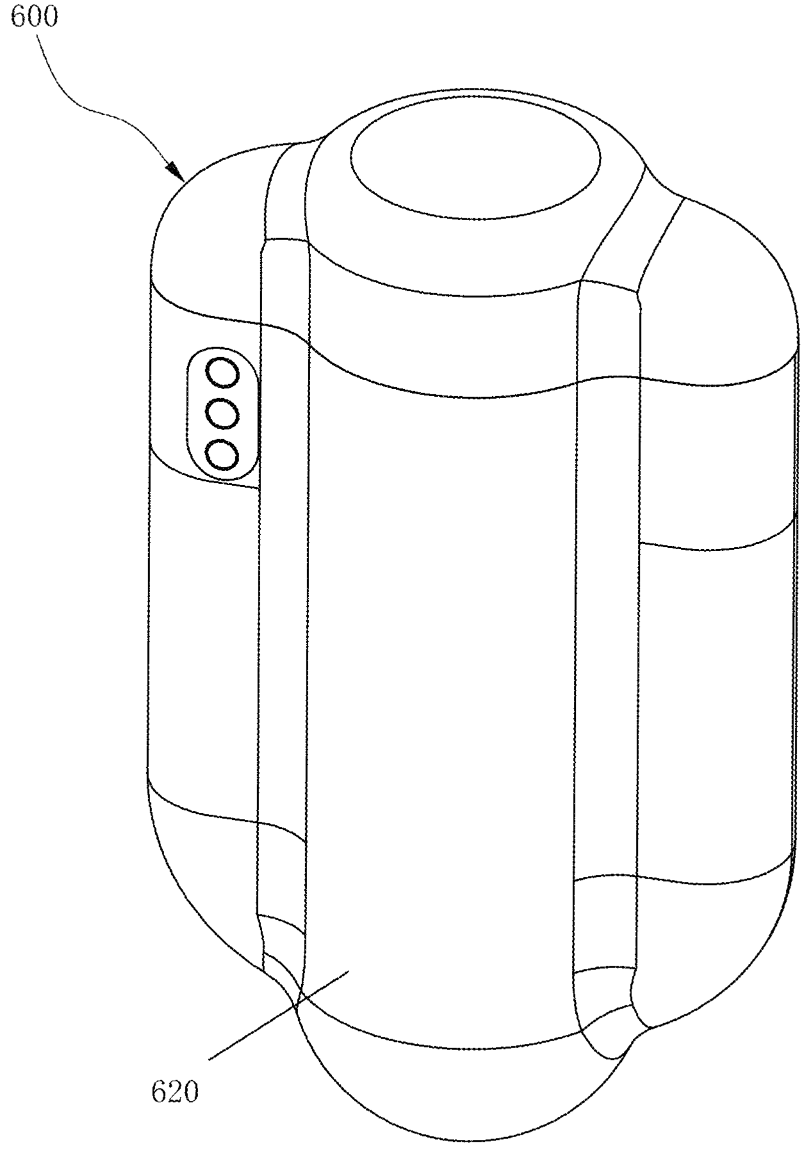
FIG. 31 is a perspective view of a sixth embodiment of a massage device of the present disclosure.
Figure 32:
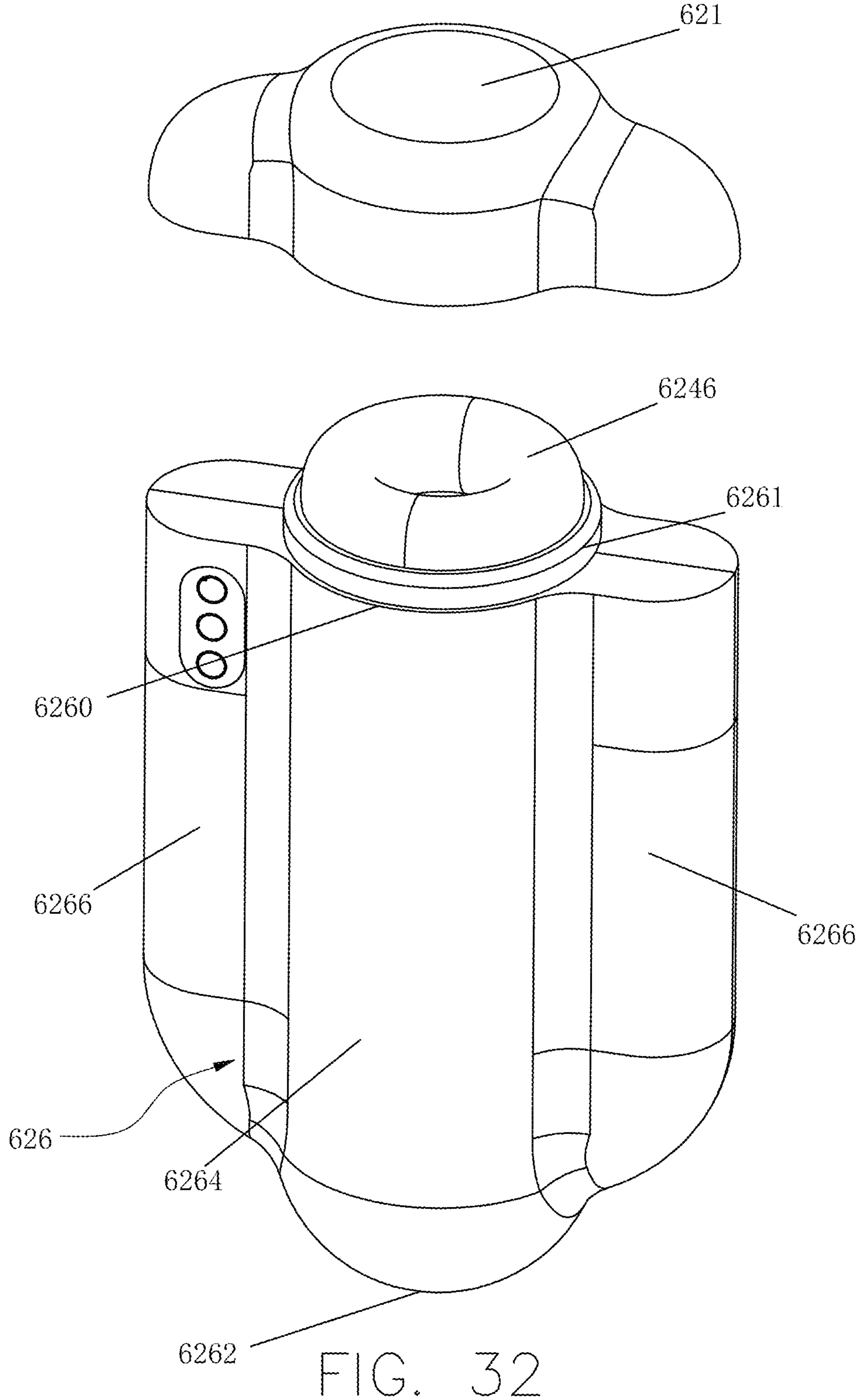
FIG. 32 is an exploded view of the massage device shown in FIG. 31.
Figure 33:
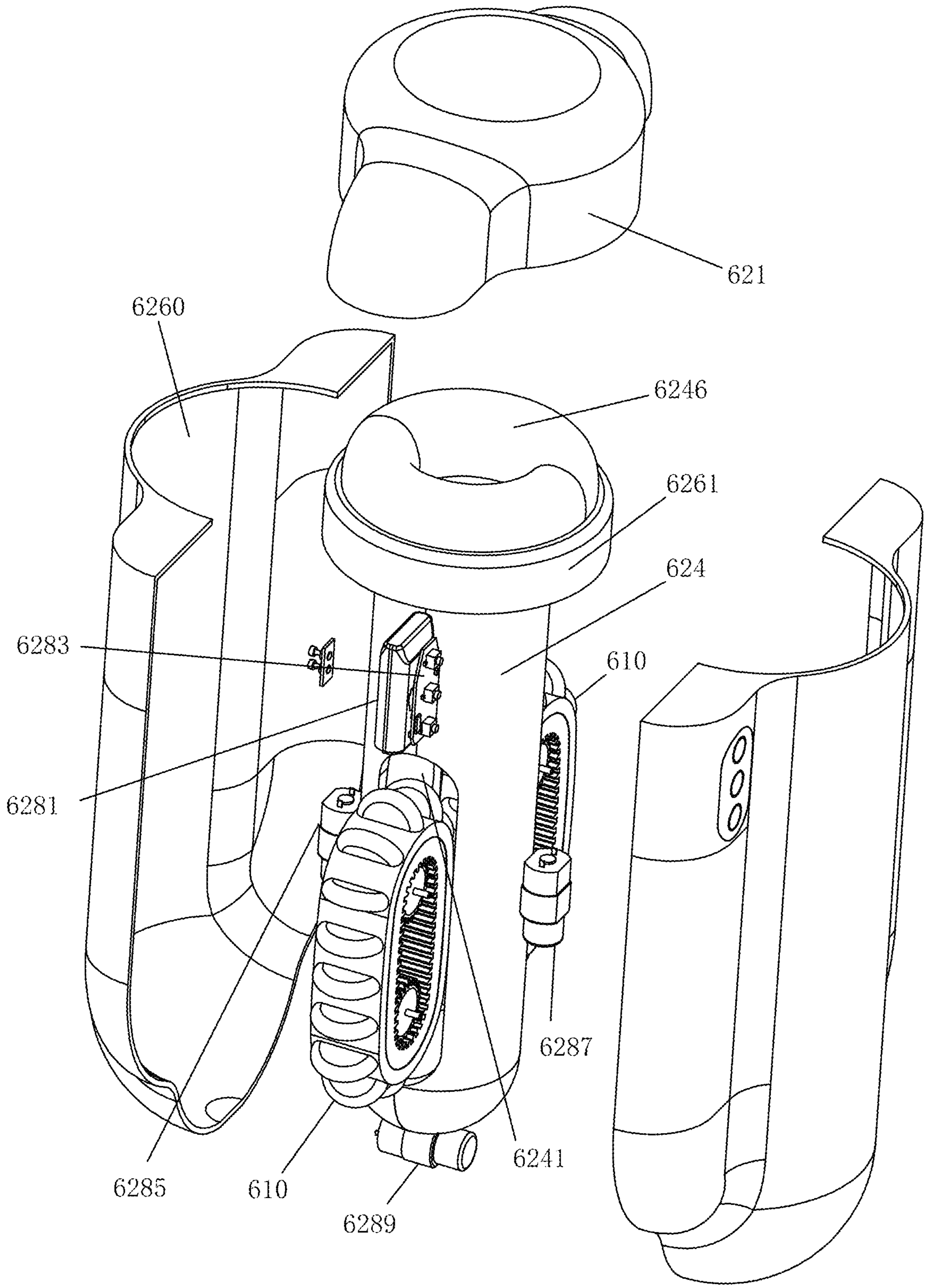
FIG. 33 is another exploded view of the massage device shown in FIG. 31.
Figure 34A:
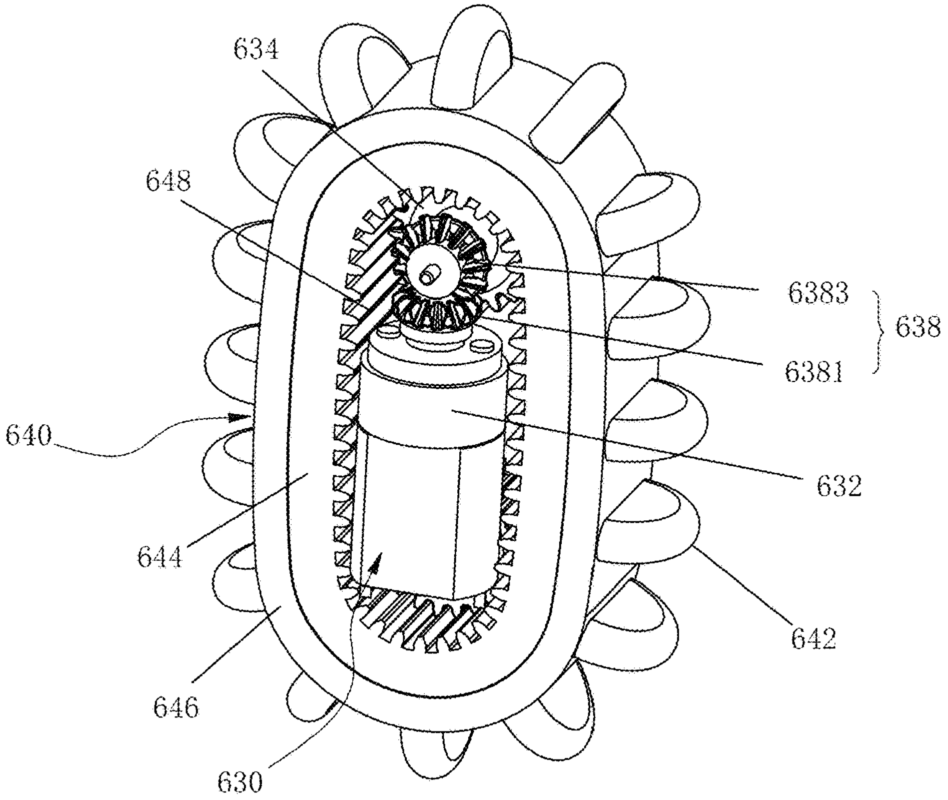
FIG. 34A is a perspective view of the massage assembly shown in FIG. 33.
Figure 34B:
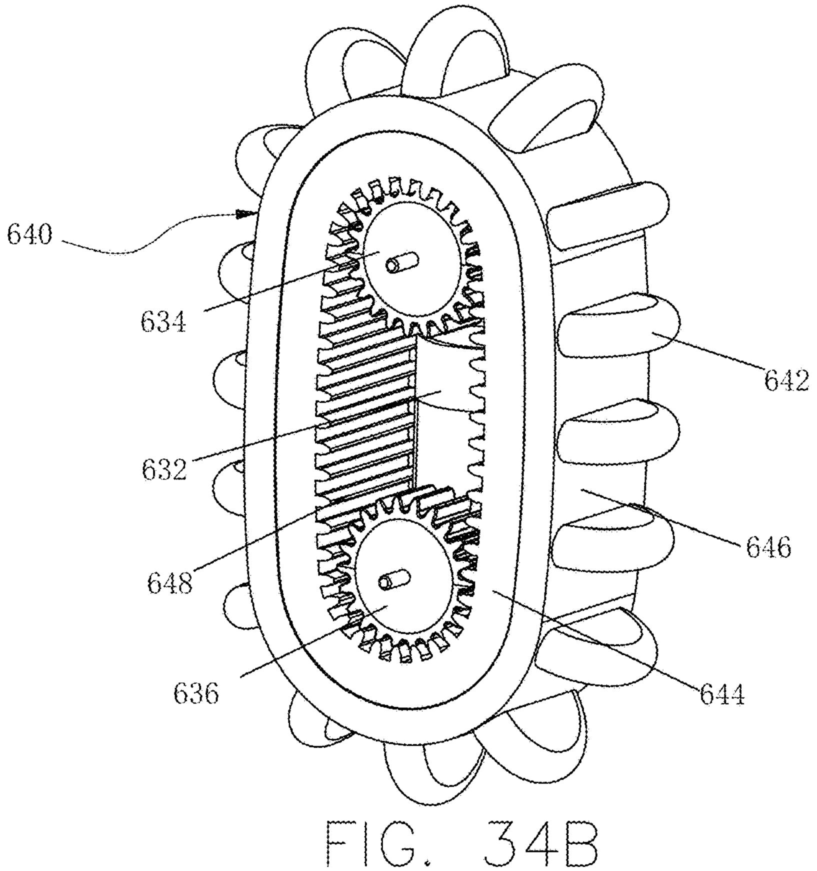
FIG. 34B is another perspective view of the massage assembly shown in FIG. 33 from another perspective.

As shown in the figures, the driving assembly 530 in the fifth embodiment does not include a gear set between the driving motor 532 and the driving wheel 534. Instead, in this embodiment, the rotating shaft 533 of the driving motor 532 is directly coaxially connected to the driving wheel 534. That is, the rotation axis of the rotating shaft 533 of the driving motor 532 is parallel to the rotation axis of the driving wheel 534. Similar to the first embodiment, the driving wheel 534 and the driven wheel 536 are also gears. However, in this embodiment, there are a plurality of driven wheel 536 meshed with the internal teeth 548 of the massage member 540, in order to improve the rotation stability of the massage member 540. As shown in FIG. 29, three driven wheel 536 are distributed at intervals along the inner circumference of the inner annular belt 544. When the driving motor 532 drives the driving wheel 534 to rotate, the driving wheel 534 drives the massage member 540 engaged with it to rotate, and the massage member 540 drives the driven wheels 536 engaged with it to rotate, so that the massage member 540 can rotate around the central axis of the elongate axial space 5244 of the housing 520.

FIGS. 31 to 35 show a massage device 600 for sexual purpose according to a sixth embodiment. Similar to the massage device 500 according to the fifth embodiment, the massage device 600 according to the sixth embodiment also includes a housing 620 and at least one massage assembly 610 provided in the housing 620. The massage assembly 610 includes a driving assembly 630 and a massage member 640. The driving assembly 630 includes a driving source, for example, a driving motor 632, a driving wheel 634 connected to the driving motor 632 and a driven wheel 636 for cooperating with the driving wheel 634. The massage member 640 surrounds and is engaged with the driving wheel 634 and the driven wheel 636. The driving motor 632 is configured to drive the massage member 640 to rotate through the driving wheel 634.

Similar to the housing 520 in the fifth embodiment, the housing 620 in the sixth embodiment also includes an inner housing 624 and an outer housing 626 covering the inner housing 624. The inner housing 624 has a hardness smaller than that of the outer housing 626. For example, the inner housing 624 can be made of flexible materials, such as silicon rubber, which can contact the skin directly. The outer housing 626 can be made of materials with a certain strength, such as plastic. However, in this embodiment, in addition to a hollow cylinder portion 6264 with an open end 6260 and an opposing close end 6262, the outer housing 626 further includes two extensions 6246 respectively connected at two sides of the hollow cylinder portion 6264. The inner housing 624 is also received in the outer housing 626 and shaped like a hollow cylinder with a first opening 6240. However, in this embodiment, the other end of the inner housing 624 opposing to the first opening 6240 is a close end 6242, and the inner housing 624 in this embodiment defines a first through hole 6241 and a second through hole 6243 on the opposite sides thereof. The inner housing 624 also defines an elongate axial space 6244 for receiving the penis and communicated with the first opening 6240. Preferably, a flexible ring 6246 is also provided at the first opening 6240 of the inner housing 624 and the open end 6260 of the outer housing 626, in order to provide a comfort feel. Preferably, the material of the flexible ring 6246 in contact with the skin is the same as that of the inner housing 624, for example silicon rubber. In order to enhance the connection between the flexible ring 6246 and the outer housing 626, a fixing ring 6261 is provided therebetween. The structure of the fixing ring 6261 can refer to the structure of the fixing ring 5261, which will not be repeated here again. In addition, the housing 620 in this embodiment further includes a detachable cover 621 abutting against the outer housing 626 for covering the first opening 6240. As shown in the FIGS. 33 and 35, a chamber 628 is defined between the outer housing 626 and the inner housing 624. Optionally, battery 6281, PCB control board 6283 among others can be arranged in the chamber 628. Preferably, one or more vibration members can be arranged in the chamber 628. As shown in the figure, in this embodiment, a first vibration member 6285, a second vibration member 6287 and a third vibration member 6289 are respectively arranged at two opposite sides and the bottom of the inner housing 626. The vibration member is preferably vibration motor. Further, in the chamber 628, there are two massage assemblies 610 respectively arranged on two opposite sides of the inner housing 626 corresponding to the first and second through holes 6241, 6243, and the massage members 640 of the massage assemblies 610 are configured to stimulate the penis received in the elongate axial space 6244 of the housing 620 through the first and second through holes 6241, 6243, respectively.

Figure 35:
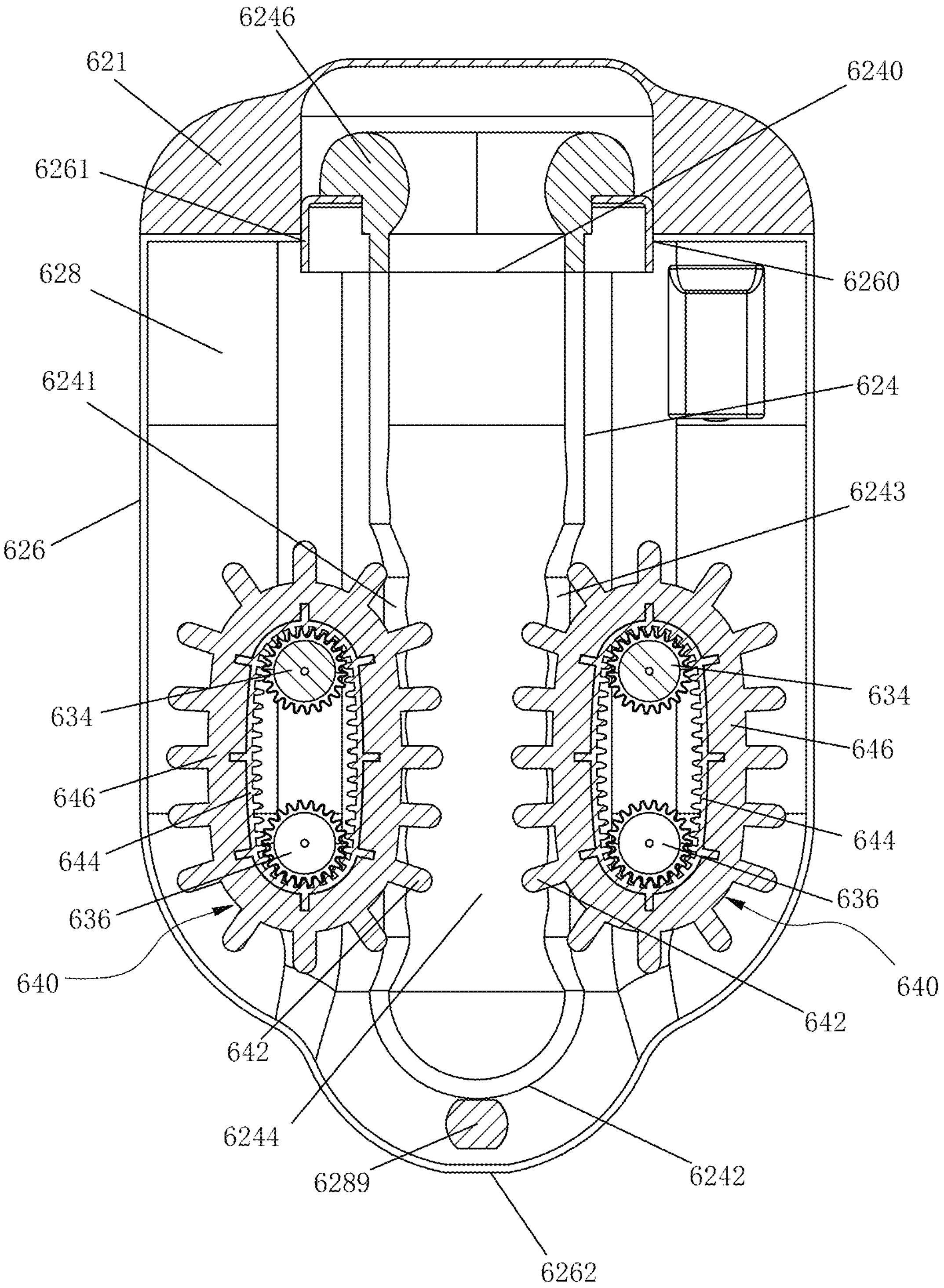
FIG. 35 is an exploded view of the massage device shown in FIG. 31.

In this embodiment, each massage assembly 610 is similar to the massage assembly 10 in the embodiment. Specifically, the massage member 640 is also shaped like an elliptical caterpillar belt, and includes an inner annular belt 644 and an outer annular belt 646 covering the inner annular belt 644. The inner annular belt 644 is provided with a plurality of internal teeth 648 on the inner surface thereof for engaging with the driving wheel 634 and the driven wheel 636. The outer surface of the outer annular belt 646 is provided with a plurality of protrusions 642. In this embodiment, the protrusions 642 are shaped like semicircular sheets (see FIGS. 34A and 34B). As shown in FIG. 35, the massage assemblies 610 are arranged so that the protrusions 642 extend into the elongate axial space 6244 through the through holes 6241, 6243, respectively, in order to stimulate the penis received in the elongate axial space 6244. In this embodiment, the driving assembly 630 of the massage assembly 610 also includes a gear set 638 provided between the driving motor 632 and the driving wheel 634. However, in this embodiment, the gear set 638 only includes a first bevel gear 6381 and a second bevel gear 6383 meshing with each other. The rotating shaft (not shown) of the driving motor 632 is inserted into the first bevel gear 6381. The second bevel gear 6383 and the driving wheel 634 are coaxially arranged and preferably formed in one piece. More preferably, the diameter of the driving wheel 634 is greater than that of the second bevel gear 6383. When the driving motor 632 drives the driving wheel 634 through the gear set 638 to rotate, the driving wheel 634 drives the massage member 640 engaged with it to rotate, and the massage member 640 drives the driven wheel 636 engaged with it to rotate, so that the massage member 640 can rotate to stimulate the penis received in the elongate axial space 6244 of the housing 620 through the first or second through hole 6241, 6243. It should be noted that the rotation directions of the massage members 640 of the two massage assemblies 610 can be the same or different.

It should be noted that the above embodiments are only for illustration. The skilled person in the art can make modifications based on the inventive concept disclosed here. For example, in other embodiments, only one massage assembly 610 can be arranged outside the inner housing 624 and corresponding to one through hole defined on the inner housing 624. Alternatively, three or more massage assemblies 610 can be arranged outside the inner housing 624, in which case, the massage assemblies 610 can be arranged at intervals around the inner housing 624 in the circumferential direction, or the massage assemblies 610 can be arranged on one side of the inner housing 624 at intervals in the axial direction, or in combination. The quantity of the through hole can be adjusted as needed, provided that the massage members 640 of the massage assemblies 610 can stimulate the penis received in the elongate axial space 6244 of the housing 620 through the through hole(s).

While the disclosure has been particularly shown and described in conjunction with exemplary embodiments, it will be appreciated that variations and modifications will occur to those skilled in the art. The embodiments according to the present disclosure may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the disclosure. In addition, while a particular feature of the disclosure may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of the disclosure.

The invention claimed is:

1. A massage device for sexual purpose, comprising:

a housing, and at least one massage assembly provided on the housing, each of the at least one massage assembly comprising:

a driving assembly disposed in the housing, the driving assembly comprising a driving source, a driving wheel connected to the driving source and at least one driven wheel for cooperating with the driving wheel, and a massage member engaged with the driving wheel and the at least one driven wheel, wherein the driving source is configured to drive the massage member to rotate through the driving wheel;

wherein the driving source comprises a rotating shaft, and a rotation axis of the rotating shaft is parallel or perpendicular to a rotation axis of the driving wheel; and wherein the driving assembly further comprises a gear set arranged between the driving source and the driving wheel, and the gear set comprises at least two bevel gears meshing with each other.

2. The massage device of claim 1, wherein the massage member has an inner surface and an outer surface, and the inner surface or the outer surface of the massage member is provided with a plurality of protrusions.

3. The massage device of claim 1, wherein the massage member is shaped like a ring with a plurality of internal teeth engaged with the driving wheel and the at least one driven wheel.

4. The massage device of claim 3, wherein the massage member comprises an inner annular belt and an outer annular belt covering the inner annular belt, and the outer annular belt has a hardness smaller than that of the inner annular belt, and wherein the plurality of internal teeth are provided on the inner annular belt.

5. The massage device of claim 1, further comprising at least one vibration member arranged in the housing.

6. The massage device of claim 1, wherein the housing has an outer circumferential surface, and the massage member is configured to rotate along the outer circumferential surface of the housing to stimulate a vagina or a rectum.

7. The massage device of claim 6, wherein the massage member is shaped like an elliptical caterpillar belt, and the housing defines an annular groove on the outer circumferential surface thereof for receiving the massage member.

8. The massage device of claim 7, further comprising a handle or a pull rope connected to the housing.

9. The massage device of claim 6, wherein the housing comprises a stick-like part configured to be inserted into the vagina or the rectum, and the massage member is coaxially or generally coaxially arranged with the stick-like part.

10. The massage device of claim 9, wherein the housing further comprises a branched part configured to stimulate an external genitalia region, and at least one of the stick-like part and the branched part is provided with a vibration member.

11. The massage device of claim 1, wherein the housing defines an elongate axial space for receiving a penis, and the massage member is disposed in the housing and configured to stimulate the penis received in the elongate axial space of the housing.

12. The massage device of claim 11, wherein the housing defines an opening on one end of the elongate axial space, the massage member is coaxially arranged at an other end of the elongate axial space opposing to the opening, the massage member has an inner surface, and the inner surface of the massage member is provided with a plurality of protrusions which protrude inwardly.

13. The massage device of claim 11, wherein the housing comprises an inner housing defining the elongate axial space therein and an outer housing sleeving the inner housing, the inner housing defines at least one through hole, and the massage member is disposed outside the inner housing and is configured to stimulate the penis received in the elongate axial space of the housing through the at least one through hole.

14. The massage device of claim 13, wherein the massage member has an outer surface, and the outer surface of the massage member is provided with a plurality of protrusions which partly extend into the elongate axial space through the at least one through hole to stimulate the penis received in the elongate axial space of the housing.

15. The massage device of claim 13, wherein the at least one massage assembly comprises at least two massage assemblies arranged outside the inner housing, the at least one through hole comprises at least two through holes, and the at least two massage assemblies are configured to stimulate the penis received in the elongate axial space of the housing through the at least two through holes defined on the inner housing, respectively.

16. A massage device for sexual purpose, comprising:

a housing comprising an inner housing and an outer housing mounted around the inner housing, a space being defined in the inner housing, a chamber being defined between the inner housing and the outer housing, and the inner housing defining a through hole to intercommunicate the space and the chamber, and a massage assembly comprising:

a driving assembly mounted in the chamber of the housing, the driving assembly comprising a driving source, a driving wheel connected to the driving source and a driven wheel cooperating with the driving wheel, and a massage member engaged with the driving wheel and the driven wheel, wherein the massage member is mounted in the chamber and extends partly into the space through the through hole.

17. The massage device of claim 16, wherein a plurality of protrusions are provided on and arranged along a circumferential direction of an outer surface of the massage member, at least one of the plurality of protrusions extends partly into the space through the through hole; and wherein the driving source is configured for driving the massage member to rotate, making the plurality of protrusions move in and out of the space to stimulate a portion of a human body inside the space during use.

18. The massage device of claim 17, wherein the plurality of protrusions are configured as balls, arc plates, pillars or convex ribs.

* * * * *